(12) United States Patent
Lepine et al.

(10) Patent No.: US 7,342,966 B2
(45) Date of Patent: Mar. 11, 2008

(54) MPEG TABLE STRUCTURE

(75) Inventors: Thierry Lepine, Paris (FR); Philippe Chouteau, Paris (FR); Antoine Burckard, Paris (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 711 days.

(21) Appl. No.: 10/344,923

(22) PCT Filed: Jun. 11, 2002

(86) PCT No.: PCT/IB02/03169

§ 371 (c)(1),
(2), (4) Date: May 29, 2003

(87) PCT Pub. No.: WO02/102081

PCT Pub. Date: Dec. 19, 2002

(65) Prior Publication Data
US 2005/0073579 A1    Apr. 7, 2005

(30) Foreign Application Priority Data

Jun. 11, 2001 (EP) ............................ 01401512
Jul. 23, 2001 (EP) ............................ 01306315

(51) Int. Cl.
*H04N 7/12* (2006.01)
*H04N 11/02* (2006.01)
(52) U.S. Cl. .................. 375/240.24; 348/460
(58) Field of Classification Search .......... 375/240.24, 375/240.26; 348/460; 725/105, 107, 116, 725/25, 100, 131, 31
See application file for complete search history.

(56) References Cited

U.S. PATENT DOCUMENTS 5,856,973 A * 1/1999 Thompson ................. 370/389
6,816,628 B1 * 11/2004 Sarachik et al. ............ 382/285

FOREIGN PATENT DOCUMENTS

EP        0 964 572 A1    12/1999

* cited by examiner

*Primary Examiner*—Gims Philippe
*Assistant Examiner*—Erick Rekstad
(74) *Attorney, Agent, or Firm*—Osha Liang LLP

(57) ABSTRACT

A MPEG table data structure includes a data portion and a header. The header includes an action identifier field, and the action identifier field relates to data that identifies an action to be carried by a receiver/decoder receiving the MPEG table data structure.

33 Claims, 14 Drawing Sheets

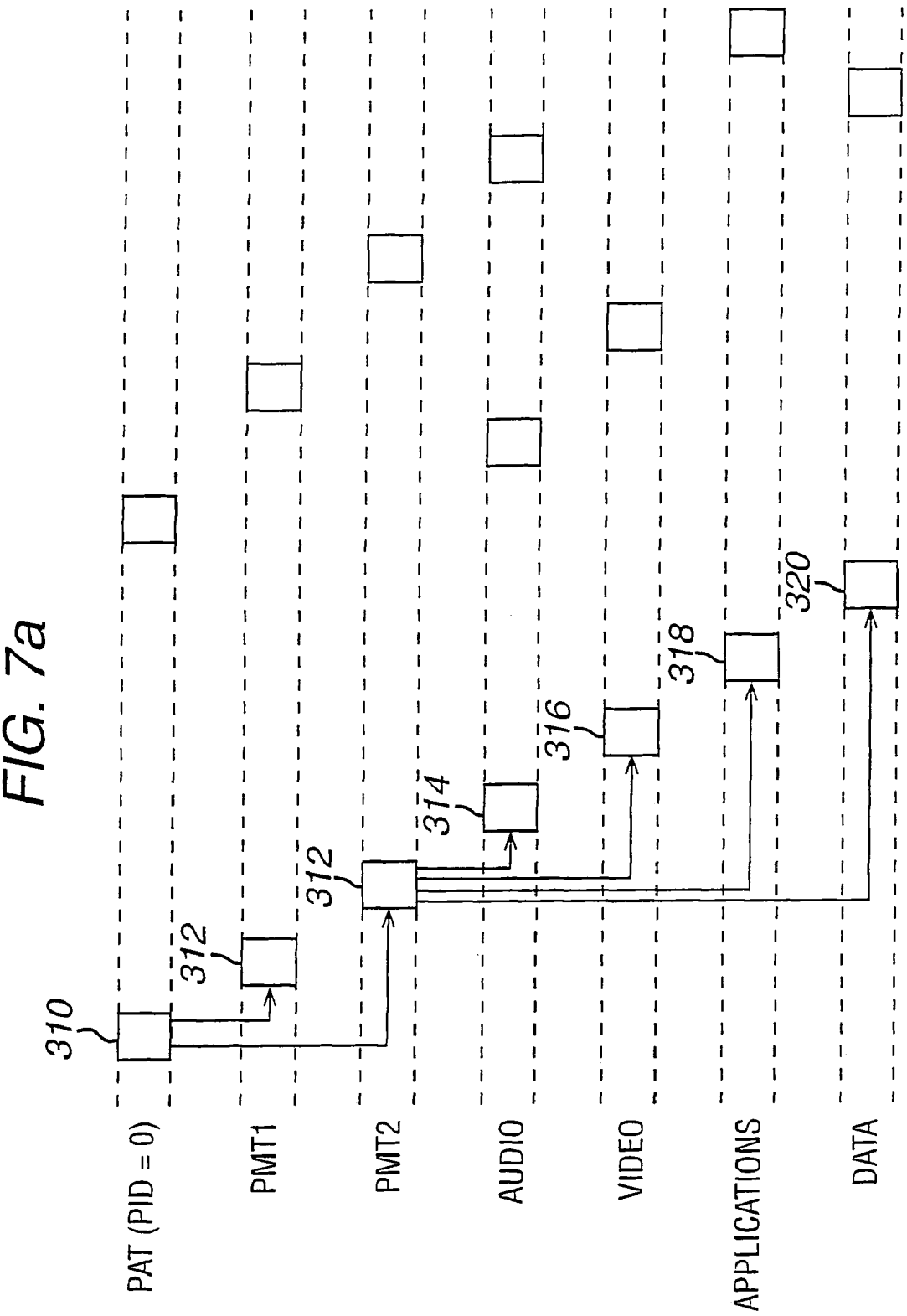

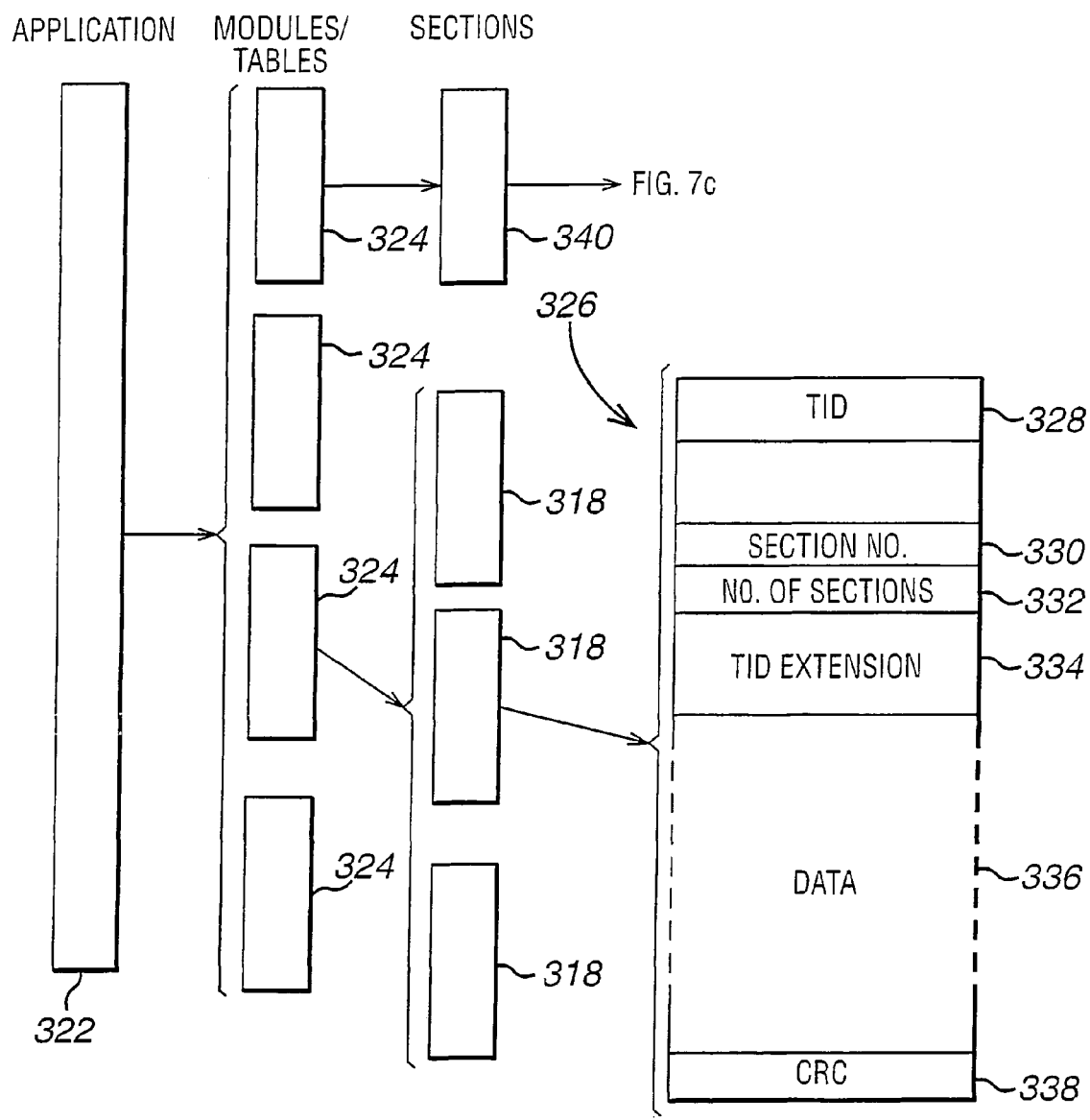

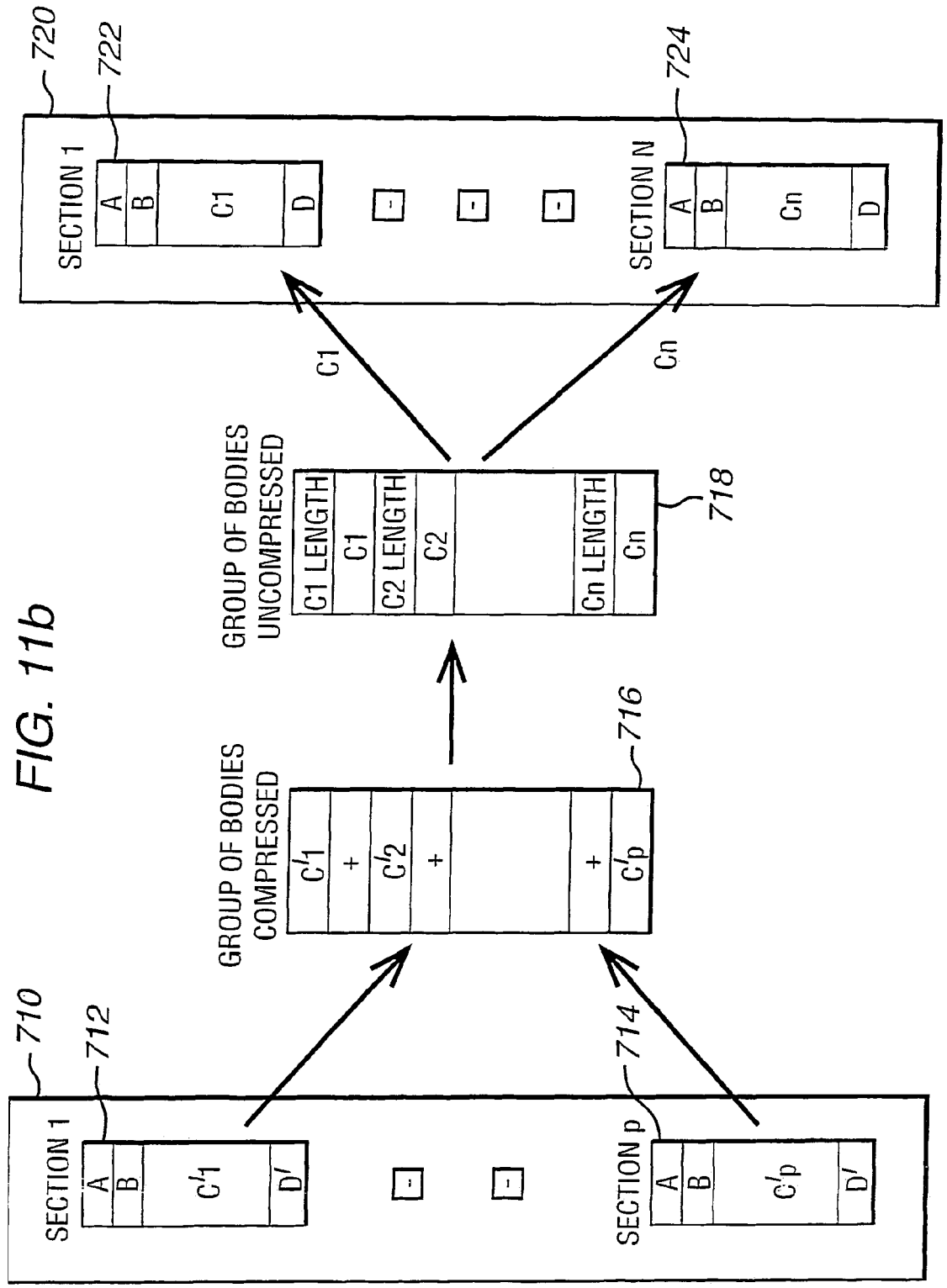

MPEG TABLE STRUCTURE

BACKGROUND OF THE INVENTION

Field of the Invention

Aspects of the present invention relate to a data structure, an MPEG table, and to methods relating to the data and/or MPEG table, to apparatus, to apparatus for carrying out such methods, a parser, a receiver/decoder, a transmitter, a broadcasting system, a computer readable medium and a signal.

Aspects of the present invention relate to a generic MPEG table processor for processing a transport packet stream. The invention is particularly suitable for a receiver/decoder for a digital transmission system, in particular for use in a digital television system.

As used herein, the term "digital television system" includes for example any satellite, terrestrial, cable and other system.

The term "receiver/decoder" as used herein may connote a receiver for receiving either encoded or non-encoded signals, for example television and/or radio signals, which may be broadcast or transmitted by some other means. The term may also connote a decoder for decoding received signals. Embodiments of such receiver/decoders may include a decoder integral with the receiver for decoding the received signals, for example, in a "set-top box", such as a decoder functioning in combination with a physically separate receiver, or such a decoder including additional functions, such as a web browser, a video recorder, or a television.

The term MPEG refers to the data transmission standards developed by the International Standards Organisation working group "Motion Pictures Expert Group" and in particular but not exclusively the MPEG-2 standard developed for digital television applications and set out in the documents ISO 13818-1, ISO 13818-2, ISO 13818-3 and ISO 13818-4. In the context of the present patent application, the term includes all variants, modifications or developments of MPEG formats applicable to the field of digital data transmission.

SUMMARY OF INVENTION

According to a first aspect of the present invention, there is provided a data structure for an MPEG private table section including a data portion, the data structure comprising a size specifier specifying a measure of the size of the section or the data portion, the data portion comprising at least one data block, the or each block including a further size specifier specifying a measure of the size of that block.

By having a further size specifier in addition to the specifier conventionally provided in the table section, that further size specifier specifying a measure of the size of a particular data block, the need to provide a different structure for each use of the MPEG private table section can be eliminated, since a generic data structure can be defined. Furthermore, the table section can be backwards compatible, since the conventional size specifier can be retained.

It will be understood that the MPEG standard size specifier as referred to above specifies the size of the section in terms of the number of remaining bytes in the section after the size specifier. However, other measures of the size of the section or the data portion fall within the ambit of this invention.

In particular, in order to achieve more complex data structures, the data portion preferably comprises a plurality of data blocks, each including a respective one of such further size specifiers.

According to a further aspect of the invention, there is provided a data structure for an MPEG private table section including a data portion, the data portion comprising a plurality of data blocks, each block including a size specifier specifying a measure of the size of its respective block.

The structure preferably further comprises a list of blocks.

This can allow a yet more complex data structure. A list may contain no blocks, one block or a plurality (or indeed multiplicity) of blocks.

Preferably, such a list includes a list specifier specifying a measure of the overall size of the blocks in the list. This can allow the data structure to remain parsable. The list specifier may for example specify the number of relevant blocks or their entire length.

For yet further complex data structures, the structure preferably comprises a plurality of such lists.

The structure preferably further comprises at least one block having data common to such plurality of lists. This can improve the versatility of the data structure.

For the same reason, the or each block in such list has data specific to its particular list.

It will of course be understood that in this context, reference to a list includes reference to what that list represents.

The structure preferably comprises a plurality of blocks in such a list.

In order to afford more functionality to the data structure, the structure preferably further comprises an identifier representative of the content of a respective list.

For ease of parsing the data structure, the size specifier is located in a header portion of the block.

Preferably, at least one such block includes a tag representative of its content.

Hence, the block with the required data can be retrieved or filtered. Depending upon requirement, the tag may contain any information relevant to the content of the block.

A preferred embodiment of data structure for an MPEG private table comprises only one structure as described above.

An alternative embodiment of data structure for an MPEG private table comprises a plurality of structures as described above.

Hence two generic data structures can be defined, each of which can have a single overall structure. These two generic structures can be used dependent upon circumstances.

The structure preferably includes an MPEG standard header and a further header.

Preferably the further header includes a flag representative of the state of transformation of the data. For instance the flag may be representative of a state of compression or encryption of the data.

Alternatively, or in addition, the further header may include a flag representative of a type of transformation which has been applied to the data portion.

A further aspect of the invention provides a method of assembling an MPEG private table, comprising providing a data portion and adding a flag representative of a state or type of transformation of the data portion.

The flags described above can then be used in a subsequent processor (such as a receiver/decoder) to determine the state or type of transformation. For instance the flag may be used to distinguish between compressed and uncompressed tables, or to distinguish between encrypted and unencrypted tables. The use of flags also allows several different transformation algorithms to be in use. This creates greater flexibility, for instance enabling different algorithms to be used on different kinds of data.

Preferably the data portion has been subject to a transformation, such as compression or encryption. Preferably the standard header and further header are uncompressed and not encrypted. This ensures compatibility with existing system hardware and software.

Preferably the further header includes a filter specifier and/or a field for specifying a parser type and/or a field for specifying the priority with which the private table section is to be processed. Typically the parser type field is the first field of the further header.

According to a further aspect of the invention, there is provided a data structure for an MPEG private table section, comprising an MPEG standard header, a further header and a data portion.

The presence of the MPEG standard header can permit compatibility with existing private table sections, whilst the presence of the further header can allow the incorporation of additional functionality into the table section.

The further header preferably includes a flag representative of the state or type of transformation applied to the data portion.

The further header preferably includes a flag representative of the state of compression of the data. Hence, less bandwidth may be required. Preferably the standard header and further header are not in a compressed form.

The further header may also include a flag representative of the state of encryption of the data. The private table section may therefore only be read by those with the encryption code. Preferably the standard header and further header are not in an encrypted form.

The further header preferably also includes a filter specifier. Hence, enhanced functionality can be afforded to the filtering of the data.

The further header preferably comprises a field for specifying a parser type. This can afford greater versatility.

For ease of parsing, the parser type field is the first field of the further header.

Again for additional functionality, the further header comprises a field for specifying the priority with which the private table section is to be processed. For example, if several tables of the same kind are received at the same time, the priority field may be used to determine the order in which they are processed.

A further aspect of the invention provides a method of performing a transformation on an MPEG private table, the table comprising a data portion, the method comprising compressing the data portion so as to form a transformed data portion.

A further aspect of the invention provides a method of performing a transformation on an MPEG private table, the table comprising a data portion, the method comprising decompressing the data portion so as to form a transformed data portion.

A further aspect of the invention provides a method of performing a transformation on an MPEG private table, the table comprising a data portion, the method comprising encrypting the data portion so as to form a transformed data portion.

A further aspect of the invention provides a method of performing a transformation on an MPEG private table, the table comprising a data portion, the method comprising decrypting the data portion so as to form a transformed data portion.

The method preferably further comprises adding a flag representative of the state or type of transformation performed on the transformed data portion.

A further aspect of the invention provides a method of performing a transformation on a plurality of data blocks, comprising assembling the data blocks to form an intermediate block and performing a transformation on the intermediate block, so as to form a transformed block.

Instead of individually and separately transforming each data block, according to this aspect of the invention, the data blocks are processed in bulk in the form of an intermediate block. This can reduce processing overheads. Examples of typical transformation processes include compression, decompression, encryption and deceptions.

Preferably the transformation comprises splitting a block into a plurality of sub-blocks, and optionally adding a flag representative of the state and/or type of transformation of the data to each sub-block.

The transformed block may be transmitted to a recipient, and/or received from a transmitter.

Typically the method further comprises performing a further transformation on the transformed block: typically the inverse of said transformation.

Performing the further transformation typically comprises assembling the sub-blocks so as to form a further intermediate block, and performing the further transformation on the further intermediate block.

A standard header may be added to each sub-block.

Typically the assembling step comprises including in the intermediate block size specifiers each specifying the size of a respective data block. This enables the data blocks to be extracted from the intermediate block in a subsequent processing step. Each specifier may precede its respective data block, or may be associated with its respective data block in some other way.

Alternatively a size specifier in the transformed block may be inspected to determine how the block should be split into sub-blocks. This enables a previous data block structure to be recreated.

The transformation may be a compression, decompression, encryption or decryption.

Typically said plurality of data blocks are data portions of an MPEG private table.

The transformed block is typically also used to form part of a transformed MPEG private table.

Typically the MPEG private table comprises a plurality of table sections each including a standard header and a data portion, and the transformed MPEG private table comprises a plurality of table sections each including a standard header and a transformed data portion provided by the transformed block.

At least a part of a header in the transformed MPEG private table may be substantially identical to a part of a standard header in the MPEG private table.

The method may further comprise including a value in the transformed MPEG private table specifying the type and/or state of transformation.

The method preferably comprises the step of adding target information which identifies a receiver/decoder or group of receiver/decoders which is an intended recipient of the data.

The target information may directly identify a specific receiver/decoder or group or receiver/decoders, for instance by listing the smartcard number(s) of the identified receiver/decoders. Alternatively the target information may identify the receiver/decoder(s) in some indirect way, for instance by identifying a software or hardware platform.

A further aspect of the invention provides a data structure comprising a plurality of compressed data blocks, wherein the compressed data blocks can be decompressed to provide a plurality of decompressed data blocks, each decompressed data block including a data portion and a size specifier specifying the size of the data portion.

Typically the number of decompressed data blocks is greater than the number of compressed data blocks. This reduces processing overheads.

Typically the data structure further comprises a header associated with each compressed data block.

A further aspect of the invention provides a data structure comprising a plurality of encrypted data blocks, wherein the encrypted data blocks can be decrypted to provide a plurality of decrypted data blocks, each decrypted data block including a data portion and a size specifier specifying the size of the data portion.

Typically the data structure further comprises a header associated with each decrypted data block.

Typically the header is a standard MPEG header.

A further aspect of the invention provides a compressed MPEG private table section and/or a compressed MPEG private table. Compression of the standard MPEG private tables saves storage space and bandwidth.

A further aspect of the invention provides an encrypted MPEG private table section and/or an encrypted MPEG private table.

A further aspect of the invention provides an MPEG private table section or MPEG private table comprising target information which identifies a receiver/decoder or group of receiver/decoders which is an intended recipient of the MPEG private table section.

The target information may directly identify a specific receiver/decoder or group or receiver/decoders, for instance by listing the smartcard number(s) of the identified receiver/decoders. Alternatively the target information may identify the receiver/decoder(s) in some indirect way, for instance by identifying a software or hardware platform.

A further aspect of the invention provides a method of assembling an MPEG private table section, the method comprising inserting target information which identifies a receiver/decoder or group of receiver/decoders which is an intended recipient of the MPEG private table section.

A further aspect of the invention provides apparatus for assembling an MPEG private table, comprising means for providing a transformed data portion which has been subject to a transformation and means for adding a flag representative of the type of transformation.

A further aspect of the invention provides apparatus for performing a transformation on an MPEG private table, the table comprising a data portion, the apparatus comprising means for compressing, decompressing, encrypting and/or decrypting the data portion so as to form a transformed data portion.

A further aspect of the invention provides apparatus for performing a transformation on a plurality of data blocks, comprising means for assembling the data blocks to form an intermediate block and means for performing a transformation on the intermediate block, so as to form a transformed block.

A further aspect of the invention provides apparatus for assembling an MPEG private table section, the apparatus comprising means for inserting target information which identifies a receiver/decoder or group of receiver/decoders which is an intended recipient of the MPEG private table section.

According to a further aspect of the invention, there is provided a parser for parsing an MPEG private table section including a data portion, comprising means (for example in the form of a processor with associated memory) for parsing data in a format comprising a size specifier specifying a measure of the size of the section or the data portion, the data portion comprising at least one data block, the or each block including a further size specifier specifying a measure of the size of that block.

Preferably, the parser is adapted to parse data in a format wherein the data portion comprises a plurality of data blocks, each including a respective one of such further size specifiers.

In a further aspect of the invention, there is provided a parser for parsing an MPEG private table section including a data portion, the data portion comprising a plurality of data blocks, each block including a size specifier specifying a measure of the size of its respective block.

Preferably, the parser is adapted to parse data in a format further comprising a list of blocks.

Preferably, the parser is adapted to parse data in a format wherein such list includes a list specifier specifying a measure of the overall size of the blocks in the list.

Preferably, the parser is adapted to parse data in a format comprising a plurality of such lists.

Preferably, the parser is adapted to parse data in a format further comprising at least one block having data common to such plurality of lists.

Preferably, the parser is adapted to parse data in a format wherein the or each block in such list has data specific to its particular list.

Preferably, the parser is adapted to parse data in such a way that such specific data overrides such common data.

Preferably, the parser is adapted to parse data in a format comprising a plurality of blocks in such list.

Preferably, the parser is adapted to parse data in a format further comprising an identifier representative of the content of a respective list.

Preferably, the parser is adapted to parse data in a format wherein the size specifier is located in a header portion of the block.

Preferably, the parser is adapted to parse data in a format wherein at least one such block includes a tag representative of its content.

Preferably, the parser is adapted to parse data in a format comprising only one MPEG section.

Alternatively, the parser is adapted to parse data in a format comprising a plurality of MPEG sections.

Preferably, the parser is adapted to parse data in a format including an MPEG standard header and a further header.

According to a further aspect of the invention, there is provided a parser for parsing an MPEG private table section, comprising means (for example in the form of a processor with associated memory) for parsing data in a format comprising an MPEG standard header, a further header and a data portion.

Preferably, the parser is adapted to parse data in a format wherein the further header includes a flag representative of the state or type of transformation.

Preferably, the parser is adapted to parse data in a format wherein the further header includes a flag representative of the state of compression of the data.

Preferably, the parser is adapted to parse data in a format wherein the further header includes a flag representative of the state of encryption of the data.

Preferably, the parser is adapted to parse data in a format wherein the further header includes a filter specifier.

Preferably, the parser is adapted to parse data in a format wherein the further header comprises a field for specifying a parser type.

Preferably, the parser is adapted to parse data in a format wherein the parser type field is the first field of the further header.

Preferably, the parser is adapted to parse data in a format wherein the further header comprises a field for specifying the priority with which the private table section is to be processed.

According to a further aspect of the invention, there is provided a parser for parsing an MPEG private table section comprising an MPEG standard header and a data portion, the MPEG standard header including a TID extension field, comprising means (for example in the form of a processor with associated memory) for outputting the value of the TID extension field. Previously, the TID extension field had been ignored.

According to a further aspect of the invention, there is provided an apparatus for processing data comprising means (for example in the form of a processor with associated memory) for converting such data between a given format and data in the format of a data structure as described herein.

According to a further aspect of the invention, there is provided apparatus for assembling an MPEG private table, comprising means (for example in the form of a processor with associated memory) for providing a data portion and means (for example in the form of a processor with associated memory) for adding a flag representative of a state or type of transformation of the data portion.

Preferably, the data portion is a transformed data portion which has been subject to a transformation.

According to a further aspect of the invention, there is provided apparatus for performing a transformation on an MPEG private table, the table comprising a data portion, the apparatus comprising means (for example in the form of a processor with associated memory) for compressing, decompressing, encrypting or decrypting the data portion so as to form a transformed data portion.

Preferably, the apparatus further comprises means (for example in the form of a processor with associated memory) for adding a flag representative of the state of transformation of the transformed data portion.

Preferably, the apparatus further comprises means (for example in the form of a processor with associated memory) for adding a flag representative of the type of transformation performed on the data portion.

According to a further aspect of the invention, there is provided apparatus for performing a transformation on a plurality of data blocks, comprising means (for example in the form of a processor with associated memory) for assembling the data blocks to form an intermediate block and means (for example in the form of a processor with associated memory) for performing a transformation on the intermediate block, so as to form a transformed block.

Preferably, the performing means comprises means (for example in the form of a processor with associated memory) for splitting a block into a plurality of sub-blocks.

Preferably, the apparatus further comprises means (for example in the form of a processor with associated memory) for adding a flag representative of the state of transformation of the data to a sub-block.

Preferably, the apparatus further comprises means (for example in the form of a processor with associated memory) for adding a flag representative of the type of transformation to a sub-block.

Preferably, the apparatus further comprises means (for example in the form of a processor with associated memory) for transmitting the transformed block to a recipient.

Preferably, the apparatus further comprises means (for example in the form of a processor with associated memory) for receiving the transformed block.

Preferably, the apparatus further comprises means (for example in the form of a processor with associated memory) for performing a further transformation on the transformed block.

Preferably, said further transformation is the inverse of said transformation.

Preferably, the apparatus further comprises means (for example in the form of a processor with associated memory) for assembling the sub-blocks so as to form a further intermediate block, and means (for example in the form of a processor with associated memory) for performing the further transformation on the further intermediate block.

Preferably, the apparatus further comprises means (for example in the form of a processor with associated memory) for adding a standard header to each sub-block.

Preferably, the apparatus further comprises means (for example in the form of a processor with associated memory) for including in the intermediate block size specifiers each specifying the size of a respective data block.

Preferably, the apparatus further comprises means (for example in the form of a processor with associated memory) for inspecting a size specifier in a block to determine how the block should be split into sub-blocks.

Preferably, the transformation is a compression, decompression, encryption or decryption.

Preferably, said plurality of data blocks are data portions of an MPEG private table.

Preferably, the apparatus further comprises means (for example in the form of a processor with associated memory) for forming a transformed MPEG private table having at least one transformed data portion provided by the transformed block.

Preferably, the apparatus further comprises means (for example in the form of a processor with associated memory) for including a value in the transformed MPEG private table specifying the type of transformation.

Preferably, the apparatus further comprises means (for example in the form of a processor with associated memory), for including a value in the transformed MPEG private table specifying the state of transformation of the transformed data portion.

There is preferably provided a receiver/decoder including a parser as described above. The present invention is not, however, limited to a receiver/decoder, but can be implemented in PCs, for example.

The data may be transmitted in a broadcast stream. The data can then be extracted at the receiver end from the broadcast stream.

In a preferred embodiment the method is employed in a system including a digital broadcast centre, and a plurality of receiver/decoders.

The data can then be employed in a variety of tasks. For instance it may contain action notification data for controlling a function of the receiver/decoder. Alternatively the data may contain key data for use by a receiver/decoder to obtain access to a conditional access system.

Alternatively the data may contain programme information for use in a video-on-demand system.

Preferably, the data portions or blocks contain programme information for at least one asset of a given category, and the data portions or blocks are accompanied by a filter specifier containing a category identifier identifying said category. An asset is preferably a television programme or other offering available through the video-on-demand system, assets preferably being categorized according to their content; for example, there may be a sports category, a film category and so on. There may also be subcategories. In this way, filtering may be performed on the category identifier, allowing the information on assets in a desired category to be retrieved more easily.

Alternatively or in addition, the data portions or blocks contain programme information for an asset, and the data portions or blocks are accompanied by a filter specifier containing an asset identifier identifying said asset. This allows information on a particular asset to be retrieved more easily.

Preferably, the filter specifier is a TID extension field of an MPEG table section. Since many receiver/decoders provide facilities for filtering MPEG table sections according to a number of header fields, including the TID extension field, and since such facilities are often provided in hardware, information may be more easily and quickly retrieved by such decoders when the TID extension field is used in this way.

The receiver/decoder preferably includes means (for example in the form of a processor with associated memory) for receiving the value of the TID extension field and for processing such value.

The receiving and processing means is preferably adapted to process such value as a notification to a user of the receiver/decoder.

The receiving and processing means is preferably adapted to process such value as data concerning content received by the receiver/decoder.

There is preferably provided a receiver/decoder adapted to receive and/or decode data in a data structure as described earlier or which has been assembled, processed or transformed as described earlier.

A transmitter adapted to transmit data in a data structure as described earlier, or which has been assembled, processed or transformed as described earlier.

There is further provided a broadcasting system incorporating a receiver/decoder and a transmitter described above.

The data in the broadcasting system is preferably conditional access data, the system being adapted to transmit and receive such data on a separate channel.

There is also provided a method of processing data comprising converting such data between a given format and data in the format of a data structure as described earlier. The given format may be any format into which or out of which it may be desired to convert data from the format of the data structure as aforesaid.

According to a further aspect of the invention, there is provided a method of transmitting an MPEG private table, comprising performing a transformation on the MPEG private table using a method as described herein, and transmitting the transformed table.

A further aspect provides a method of receiving an MPEG private table, comprising receiving the MPEG private table and performing a transformation on the received table using a method as described herein.

Preferably, the data portions or blocks contain action notification data for reception by a receiver/decoder and for controlling a function of the receiver/decoder.

Preferably, the data portions or blocks contain programme information for use in a video-on-demand system.

Preferably, the data portions or blocks contain programme information for at least one asset of a given category, and wherein the data portions or blocks are accompanied by a filter specifier containing a category identifier identifying said category.

Preferably, the data portions or blocks contain programme information for an asset, and wherein the data portions or blocks are accompanied by a filter specifier containing an asset identifier identifying said asset.

Preferably, the filter specifier is a TID extension field of an MPEG table section.

Preferably, the data portions or blocks contain key data for use by a receiver/decoder to obtain access to a conditional access system.

A further aspect of the invention provides a parser comprising means (for example in the form of a processor with associated memory) for parsing an MPEG private table or table section as described herein, or for parsing data having a data structure as described herein, or for parsing data which has been processed, assembled or transformed by a method as described herein.

A further aspect of the invention provides a transmitter adapted to transmit an MPEG private table or table section as described herein, or which has been processed, assembled or transformed by a method as described herein.

A further aspect of the invention provides a parser adapted to perform a method as described herein.

The invention also provides a method substantially as described herein with reference to the accompanying drawings, and apparatus substantially as described herein with reference to and as illustrated in the accompanying drawings.

The invention extends to a computer program product adapted to perform a method as aforesaid.

The invention further extends to a computer readable medium embodying a parser or apparatus as described above.

The invention yet further extends to a signal tangibly embodying a parser or apparatus as described above.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

Features implemented in hardware may generally be implemented in software, and vice versa. Any references to software and hardware features herein should be construed accordingly.

Any feature in one aspect of the invention may be applied to other aspects of the invention, in any appropriate combination. In particular, method aspects may be applied to apparatus aspects, and vice versa.

BRIEF DESCRIPTION OF THE DRAWINGS

Preferred features of the present invention will now be described, purely by way of example, with reference to the accompanying drawings, in which:—

FIG. 7a illustrates an interrelationship between a number of components of an MPEG stream;

FIG. 7b shows how an application may be made up of modules/tables, which in turn may be made up of sections;

FIG. 11B illustrates the decompression of a compressed private table.

DETAILED DESCRIPTION

System Overview

Figure 1:
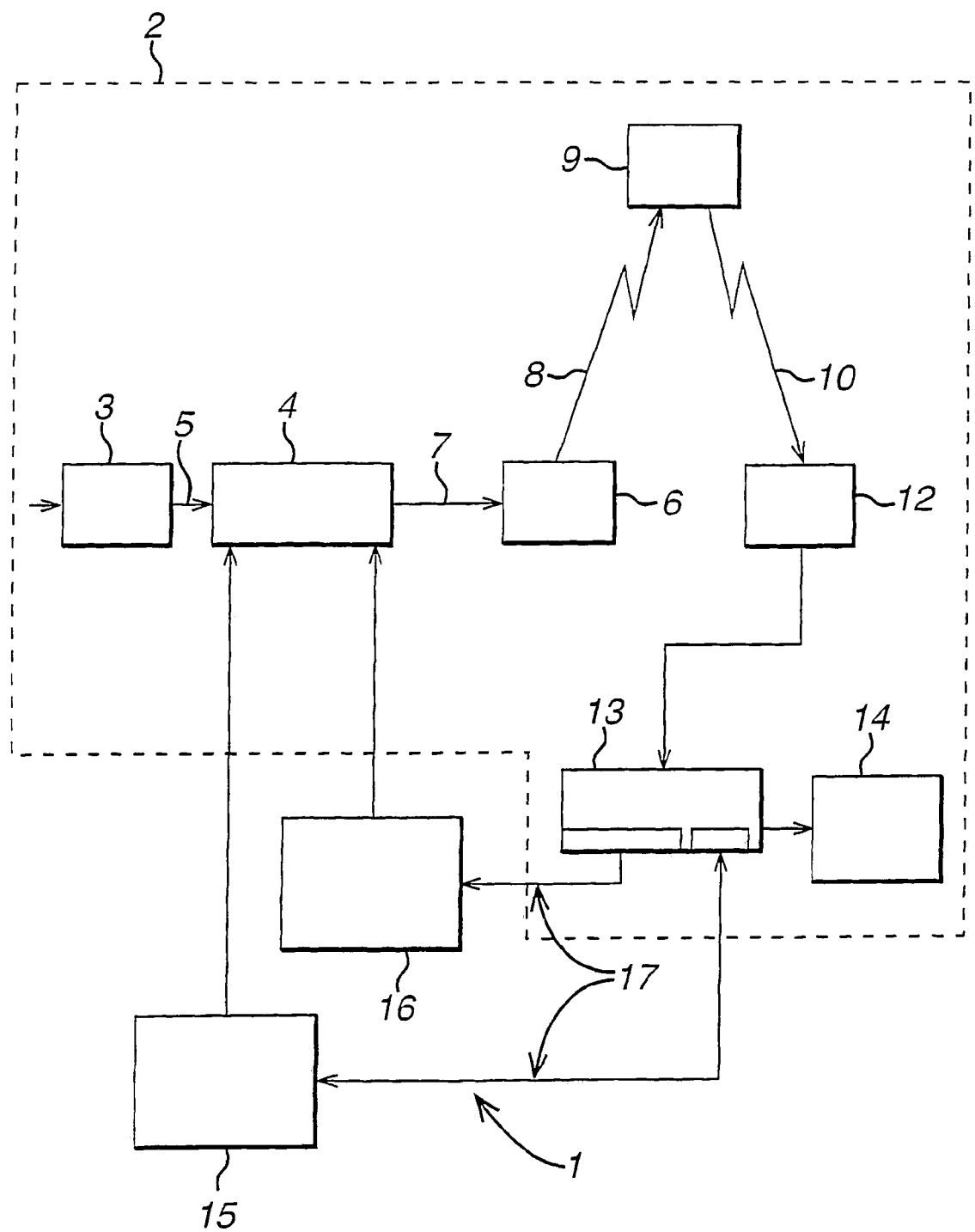
FIG. 1 shows the overall architecture of a digital television system.

An overview of a digital television system 1 is shown in FIG. 1. The invention includes a mostly conventional digital television system 2 that uses the known MPEG-2 compression system to transmit compressed digital signals. In more detail, MPEG-2 compressor 3 in a broadcast centre receives a digital signal stream (typically a stream of video signals). The compressor 3 is connected to a multiplexer and scrambler 4 by linkage 5.

The multiplexer 4 receives a plurality of further input signals, assembles the transport stream and transmits compressed digital signals to a transmitter 6 of the broadcast centre via linkage 7, which can of course take a wide variety of forms including telecommunications links. The transmitter 6 transmits electromagnetic signals via uplink 8 towards a satellite transponder 9, where they are electronically processed and broadcast via notional downlink 10 to earth receiver 12, conventionally in the form of a dish owned or rented by the end user. Other transport channels for transmission of the data are of course possible, such as terrestrial broadcast, cable transmission, combined satellite/cable links, telephone networks etc.

The signals received by receiver 12 are transmitted to an integrated receiver/decoder 13 owned or rented by the end user and connected to the end user's television set 14. The receiver/decoder 13 decodes the compressed MPEG-2 signal into a television signal for the television set 14. Although a separate receiver/decoder is shown in FIG. 1, the receiver/decoder may also be part of an integrated digital television. As used herein, the term "receiver/decoder" includes a separate receiver/decoder, such as a set-top box, and a television having a receiver/decoder integrated therewith.

In a multichannel system, the multiplexer 4 handles audio and video information received from a number of parallel sources and interacts with the transmitter 6 to broadcast the information along a corresponding number of channels. In addition to audiovisual information, messages or applications or any other sort of digital data may be introduced in some or all of these channels interlaced with the transmitted digital audio and video information.

A conditional access system 15 is connected to the multiplexer 4 and the receiver/decoder 13, and is located partly in the broadcast centre and partly in the receiver/decoder. It enables the end user to access digital television broadcasts from one or more broadcast suppliers. A smartcard, capable of deciphering messages relating to commercial offers (that is, one or several television programmes sold by the broadcast supplier), can be inserted into the receiver/decoder 13. Using the receiver/decoder 13 and smartcard, the end user may purchase commercial offers in either a subscription mode or a pay-per-view mode.

As mentioned above, programmes transmitted by the system are scrambled at the multiplexer 4, the conditions and encryption keys applied to a given transmission being determined by the access control system 15. Transmission of scrambled data in this way is well known in the field of pay TV systems. Typically, scrambled data is transmitted together with a control word for descrambling of the data, the control word itself being encrypted by a so-called exploitation key and transmitted in encrypted form.

The scrambled data and encrypted control word are then received by the receiver/decoder 13 having access to an equivalent to the exploitation key stored on a smartcard inserted in the receiver/decoder to decrypt the encrypted control word and thereafter descramble the transmitted data. A paid-up subscriber will receive, for example, in a broadcast monthly EMM (Entitlement Management Message) the exploitation key necessary to decrypt the encrypted control word so as to permit viewing of the transmission.

An interactive system 16, also connected to the multiplexer 4 and the receiver/decoder 13 and again located partly in the broadcast centre and partly in the receiver/decoder, enables the end user to interact with various applications via a back channel 17. The back channel may be, for example a Public Switched Telephone Network (PSTN) channel (for example, a modemmed back channel) or an Out of Band (OOB) channel. The back channel may also be used for communications used in the conditional access system 15.

Conditional Access System

Figure 2:
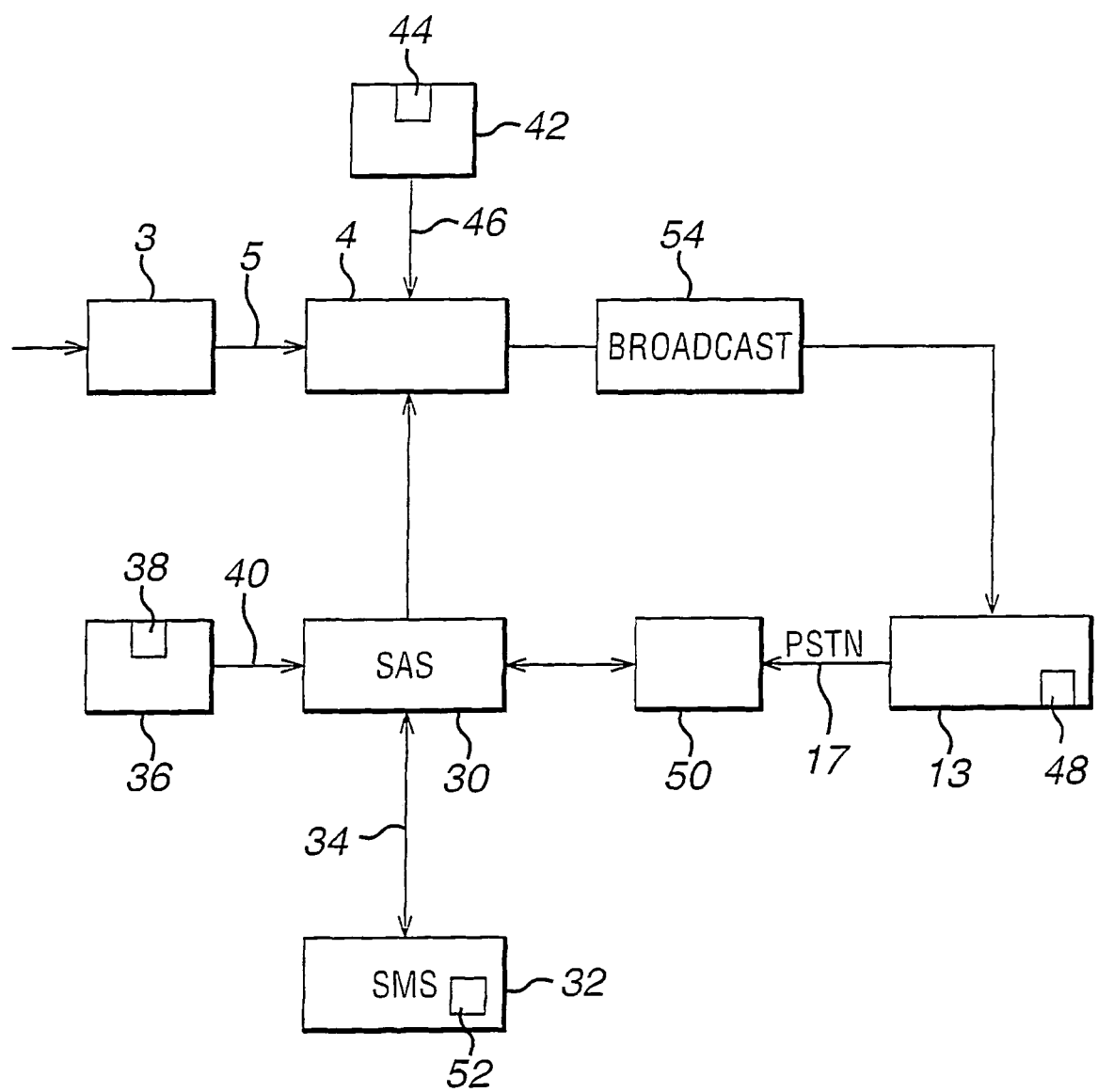
FIG. 2 shows the architecture of the conditional access system.

With reference to FIG. 2, in overview the conditional access system 15 includes a Subscriber Authorization System (SAS) 30. The SAS 30 is connected to one or more Subscriber Management Systems (SMS) 32, one SMS for each broadcast supplier, by a link 34, which may be a TCP-IP link or other type of link. Alternatively, one SMS could be shared between two commercial operators, or one operator could use two SMSs, and so on.

First encrypting units in the form of ciphering units 36 utilising "mother" smartcards 38 are connected to the SAS by linkage 40. Second encrypting units again in the form of ciphering units 42 utilising mother smartcards 44 are connected to the multiplexer 4 by linkage 46. The receiver/decoder 13 receives a "daughter" smartcard 48. The receiver/decoder is connected directly to the SAS 30 via Communications Servers 50 and the modemmed back channel 17. The SAS sends amongst other things subscription rights to the daughter smartcard on request.

The smartcards contain confidential information from one or more commercial operators. The "mother" smartcard encrypts different kinds of messages and the "daughter" smartcards decrypt the messages, if they have the rights to do so.

With reference to FIG. 2, in the broadcast centre, the digital video signal is first compressed (or bit rate reduced), using the MPEG-2 compressor 3. This compressed signal is then transmitted to the multiplexer and scrambler 4 in order to be multiplexed with other data, such as other compressed data.

The scrambler generates a control word used in the scrambling process and included in the MPEG-2stream in the multiplexer 4. The control word is generated internally and enables the end user's integrated receiver/decoder 13 to descramble the programme.

Access criteria, indicating how the programme is commercialised, are also added to the MPEG-2 stream. The programme may be commercialised in either one of a number of "subscription" modes and/or one of a number of "Pay Per View" (PPV) modes or events. In the subscription mode, the end user subscribes to one or more commercial offers, or "bouquets", thus getting the rights to watch every channel inside those bouquets. In the Pay Per View mode, the end user is provided with the capability to purchase events as he wishes.

Both the control word and the access criteria are used to build an Entitlement Control Message (ECM); this is a message sent in relation with one scrambled program; the message contains a control word (which allows for the descrambling of the program) and the access criteria of the broadcast program. The access criteria and control word are transmitted to the second encrypting unit 42 via the linkage 46. In this unit, an ECM is generated, encrypted and transmitted on to the multiplexer and scrambler 4.

Each service broadcast by a broadcast supplier in a data stream comprises a number of distinct components; for example a television programme includes a video component, an audio component, a sub-title component and so on. Each of these components of a service is individually scrambled and encrypted for subsequent broadcast. In respect of each scrambled component of the service, a separate ECM is required.

The multiplexer 4 receives electrical signals comprising encrypted EMMs from the SAS 30, encrypted ECMs from the second encrypting unit 42 and compressed programmes from the compressor 3. The multiplexer 4 scrambles the programmes and transmits the scrambled programmes, the encrypted EMMs and the encrypted ECMs as electric signals to broadcast system 54, which may be for example a satellite system as shown in FIG. 1, or other broadcast system. The receiver/decoder 13 demultiplexes the signals to obtain scrambled programmes with encrypted EMMs and encrypted ECMs.

The receiver/decoder receives the broadcast signal and extracts the MPEG-2 data stream. If a programme is scrambled, the receiver/decoder 13 extracts the corresponding ECM from the MPEG-2 stream and passes the ECM to the "daughter" smartcard 48 of the end user. This slots into a housing in the receiver/decoder 13. The daughter smartcard 48 controls whether the end user has the right to decrypt the ECM and to access the programme. If not, a negative status is passed to the receiver/decoder 13 to indicate that the programme cannot be descrambled. If the end user does have the rights, the ECM is decrypted and the control word extracted. The decoder 13 can then descramble the programme using this control word. The MPEG-2 stream is decompressed and translated into a video signal for onward transmission to television set 14.

If the programme is not scrambled, no ECM will have been transmitted with the MPEG-2 stream and the receiver/decoder 13 decompresses the data and transforms the signal into a video signal for transmission to television set 14.

The Subscriber Management System (SMS) 30 includes a database 52 which manages, amongst others, all of the end user files, commercial offers (such as tariffs and promotions), subscriptions, PPV details, and data regarding end user consumption and authorization. The SMS may be physically remote from the SAS.

The SMS 32 transmits messages to the SAS 30 which imply modifications to or creations of Entitlement Management Messages (EMMs) to be transmitted to end users. The SMS 32 also transmits messages to the SAS 30 which imply no modifications or creations of EMMs but imply only a change in an end user's state (relating to the authorization granted to the end user when ordering products or to the amount that the end user will be charged). The SAS 30 also sends messages (typically requesting information such as call-back information or billing information) to the SMS 32, so that it will be apparent that communication between the two is two-way.

Entitlement Management Messages (EMMs)

The EMM is a message dedicated to an individual end user (subscriber), or a group of end users, only, in contrast with an ECM, which is dedicated to one scrambled programme only or a set of scrambled programmes if part of the same commercial offer.

Various specific types of EMM are possible. Individual EMMs are dedicated to individual subscribers, and are typically used in the provision of Pay Per View services; these contain the group identifier and the position of the subscriber in that group. So-called "Group" subscription EMMs are dedicated to groups of, say, 256 individual users, and are typically used in the administration of some subscription services. Audience EMMs are dedicated to entire audiences. An "audience" is the totality of subscribers having smartcards which bear the same Operator Identifier (OPI). Finally, a "unique" EMM is addressed to the unique identifier of the smartcard.

Figure 3:
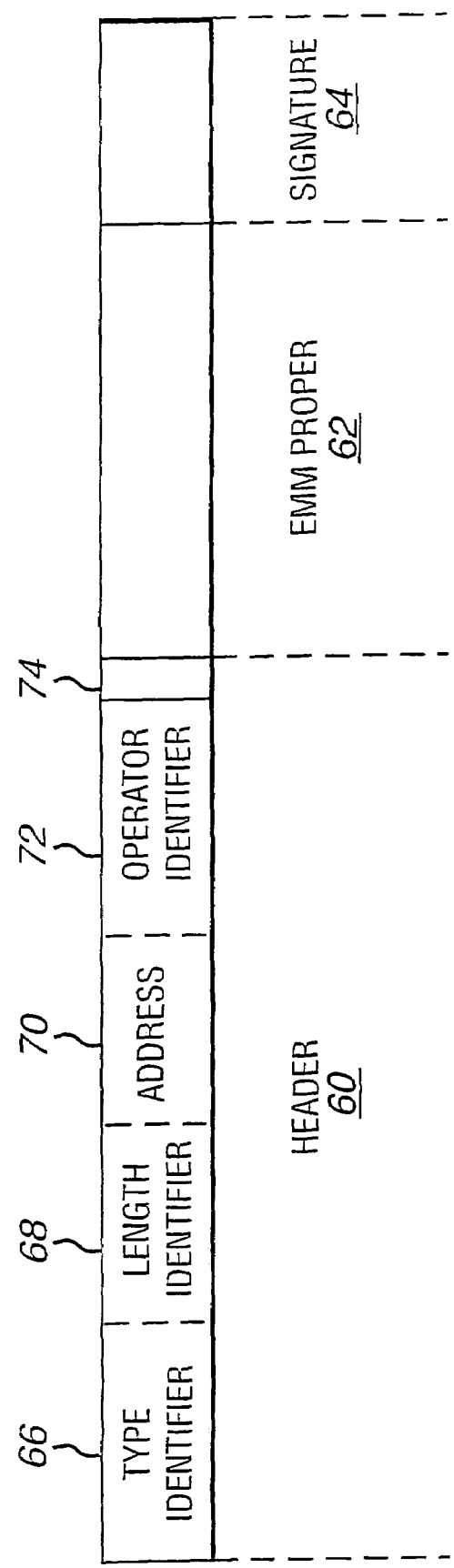
FIG. 3 shows the general form of an EMM.

The general form of an EMM which is used in the preferred embodiments is now described with reference to FIG. 3. Basically, the EMM, which is implemented as a series of digital data bits, comprises a header 60, the EMM proper 62, and a signature 64. The header 60 in turn comprises a type identifier 66 to identify the type of EMM, a length identifier 68 which gives the length of the EMM, an optional address 70 for the EMM, an operator identifier 72 and a key identifier 74. Finally, the signature 64, which is also optional, provides a number of checks against corruption of the remaining data in the EMM. The type identifier in the header identifies the message as an EMM.

Subscriber Authorization System (SAS)

Messages generated by the SMS 32 are passed via linkage 34 to the Subscriber Authorization System (SAS) 30, which in turn generates messages acknowledging receipt of the messages generated by the SMS 32 and passes these acknowledgements to the SMS 32 Messages which may be passed to the SAS include subscriber suspension, for example, due to non-payment, subscriber modification, for example to add or remove certain commercial offers, and provide rights, for example for a specific event in PPV mode.

The SAS 30 manages databases that store the status of all subscribers declared by the SMS 32. According to the status and the various messages sent by the SMS, the SAS generates EMMs for the subscribers' smartcards. The EMMs are ciphered by the SAS cyphering units 36 and sent to the multiplexer 4. To ensure that the EMMs are received by the subscriber, the SAS sends these messages cyclically. The cycle depends on the type of EMM, but is typically between 30 seconds and 30 minutes.

Figure 4:
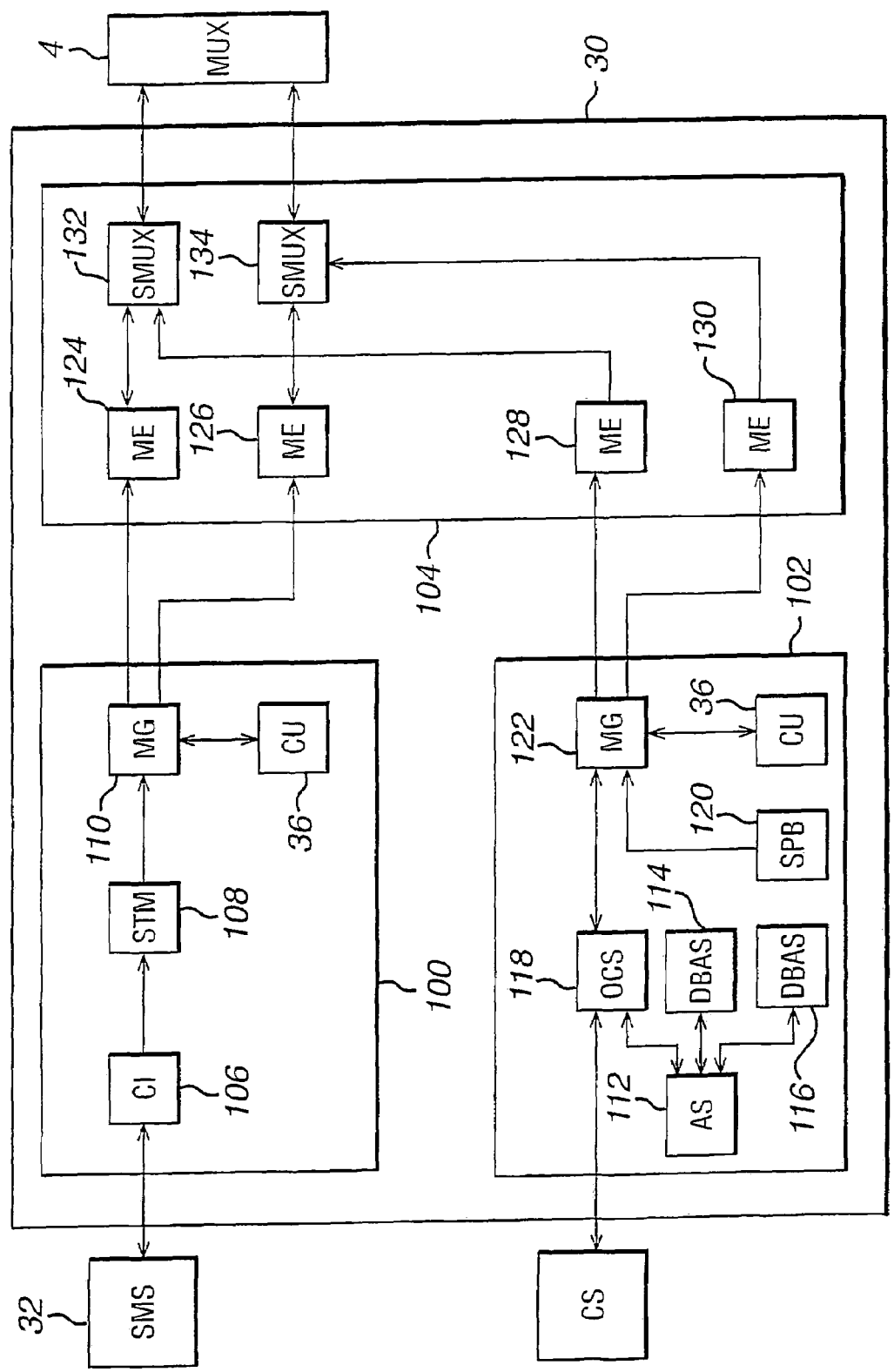
FIG. 4 shows a typical configuration of the SAS.

A typical configuration of the SAS 30 is shown in FIG. 4. In overview the SAS 30 comprises a Subscription Chain area 100 to give rights for subscription mode and to renew the rights automatically each month, a Pay Per View (PPV) Chain area 102 to give rights for PPV events, and an EMM Injector 104 for passing EMMs created by the Subscription and PPV chain areas to the multiplexer and scrambler 4, and hence to feed the MPEG stream with EMMs. If other rights are to be granted, such as Pay Per File (PPF) rights in the case of downloading computer software to a user's Personal Computer, other similar areas are also provided.

One function of the SAS 30 is to manage the access rights to television programmes, available as commercial offers in subscription mode or sold as PPV events according to different modes of commercialisation (pre-book mode, impulse mode). The SAS 30, according to those rights and to information received from the SMS 32, generates EMMs for the subscriber.

The Subscription Chain area 100 comprises a Command Interface (CI) 106, a Subscriber Technical Management (STM) server 108, a Message Generator (MG) 110, and the Ciphering Unit 36. The PPV Chain area 102 comprises an Authorisation Server (AS) 112, Database Servers 114, 116 which contain relational databases for storing relevant details of the end users, Order Centralized Server (OCS) 118, a Server for Programme Broadcaster (SPB) 120, a Message Generator (MG) 122 whose function is basically the same as that for the Subscription Chain area, and Ciphering Unit 36.

The EMM Injector 104 comprises a plurality of Message Emitters (MEs) 124, 126, 128 and 130 and Software Multiplexers (SMUXs) 132 and 134. In the preferred embodiment, there are two MEs, 124 and 126 for the Message Generator 132, with the other two MEs 128 and 130 for the Message Generator 134. MEs 124 and 126 are connected to the SMUX 132 whilst MEs 128 and 130 are connected to the SMUX 134.

The Message Generators 110 and 122 transform commands issued by the STM 108 and the OCS 118, respectively, into EMMs. The MGs determine the duration and the rate of emission of the EMMs. The MGs also cipher the EMMs using a dedicated ciphering unit. They then pass the ciphered EMM to the respective MEs, which transmit the EMMs cyclically. As shown in FIG. 4, more than one ME can be connected to a single MG, the appropriate ME being determined by the MG according to the operator referred to in the EMM. During the lifetime of a given EMM, the MG stores it inside its own database. The EMM is erased from the database as soon as its emission duration has expired. This database ensures consistency between the MG and ME.

The Message Emitters 124, 126, 128, 130 receive EMMs from the respective MGs along with several parameters, such as broadcast start date, broadcast stop date, and broadcast cycle. The MGs then manage the broadcast of the EMMs according to the specified parameters.

Receiver/Decoder

Figure 5:
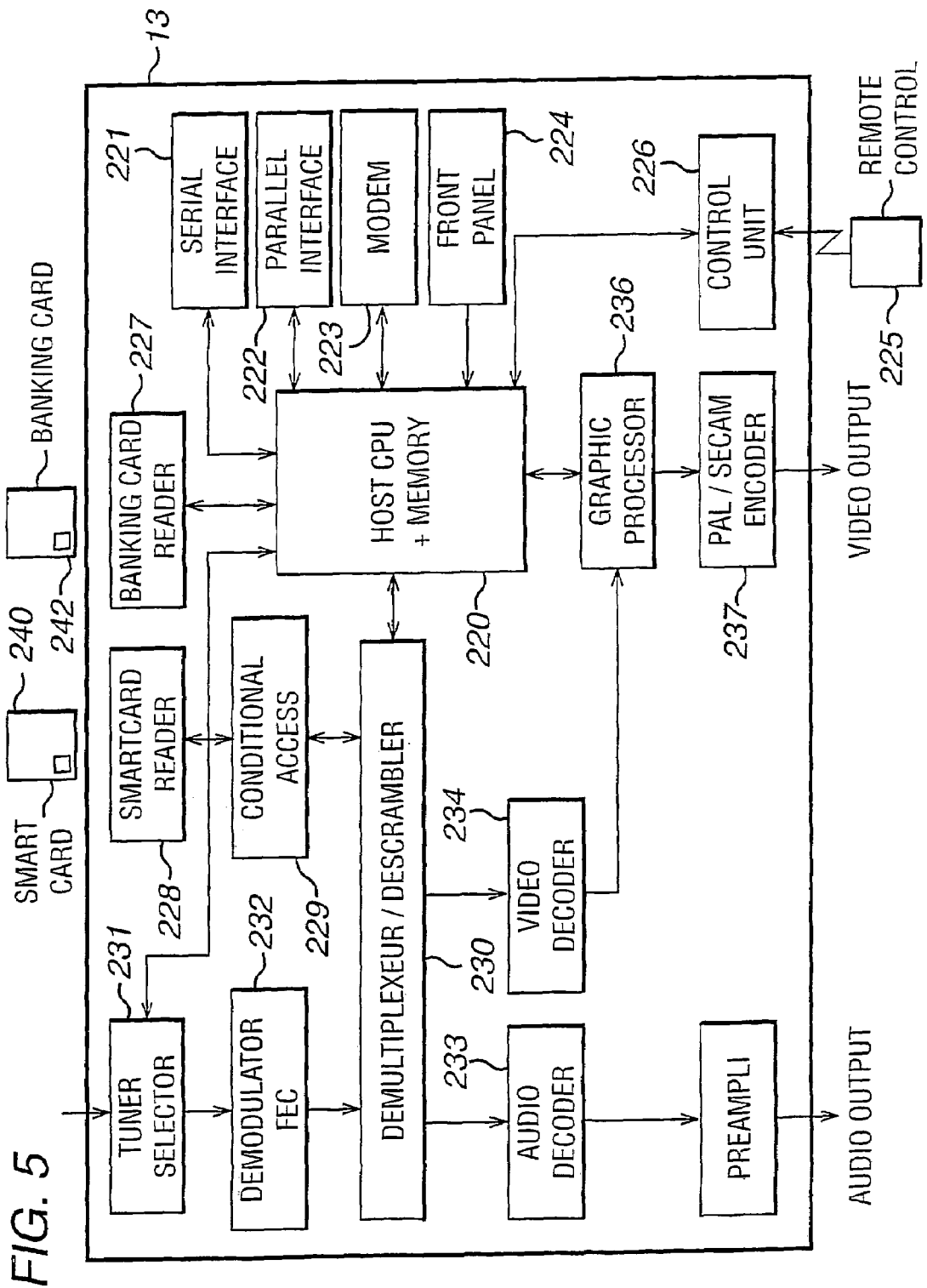
FIG. 5 shows the receiver/decoder in detail.

Referring to FIG. 5, the various elements of receiver/decoder 13 will now be described in terms of functional blocks.

The receiver/decoder 13, which may be, for example, a digital set-top box (STB), comprises a central processor 220 including associated memory elements and adapted to receive input data from a serial interface 221, a parallel interface 222, a modem 223 (connected to the modem back channel 17 of FIG. 1), and switch contacts 224 on the front panel of the decoder.

The receiver/decoder is additionally adapted to receive inputs from an infra-red remote control 225 via a control unit 226 and also possesses two smartcard readers 227, 228 adapted to read bank and subscription smartcards 242, 240 respectively. The subscription smartcard reader 228 engages with an inserted subscription card 240 and with a conditional access unit 229 to supply the necessary control word to a demultiplexer/descrambler 230 to enable the encrypted broadcast signal to be descrambled. The decoder also includes a conventional tuner 231 and demodulator 232 to receive and demodulate the satellite transmission before being filtered and demultiplexed by the unit 230.

As used in this description, an application is preferably a piece of computer code for controlling high level functions of preferably the receiver/decoder 13. For example, when the end user positions the focus of remote control 225 on a button object seen on the screen of the television set 14 and presses a validation key, the instruction sequence associated with the button is run.

An interactive application proposes menus and executes commands at the request of the end user and provides data related to the purpose of the application. Applications may be either resident applications, that is, stored in the ROM (or FLASH or other non-volatile memory) of the receiver/decoder 13, or broadcast and downloaded into the RAM or FLASH memory of the receiver/decoder 13.

Applications are stored in memory locations in the receiver/decoder 13 and represented as resource files. The resource files comprise graphic object description unit files, variables block unit files, instruction sequence files, application files and data files, as described in more detail in the above-mentioned patent specifications.

The receiver/decoder contains memory divided into a RAM volume, a FLASH volume and a ROM volume, but this physical organization is distinct from the logical organization. The memory may further be divided into memory volumes associated with the various interfaces. From one point of view, the memory can be regarded as part of the hardware; from another point of view, the memory can be regarded as supporting or containing the whole of the system shown apart from the hardware.

Architecture of Receiver/Decoder

Figure 6:
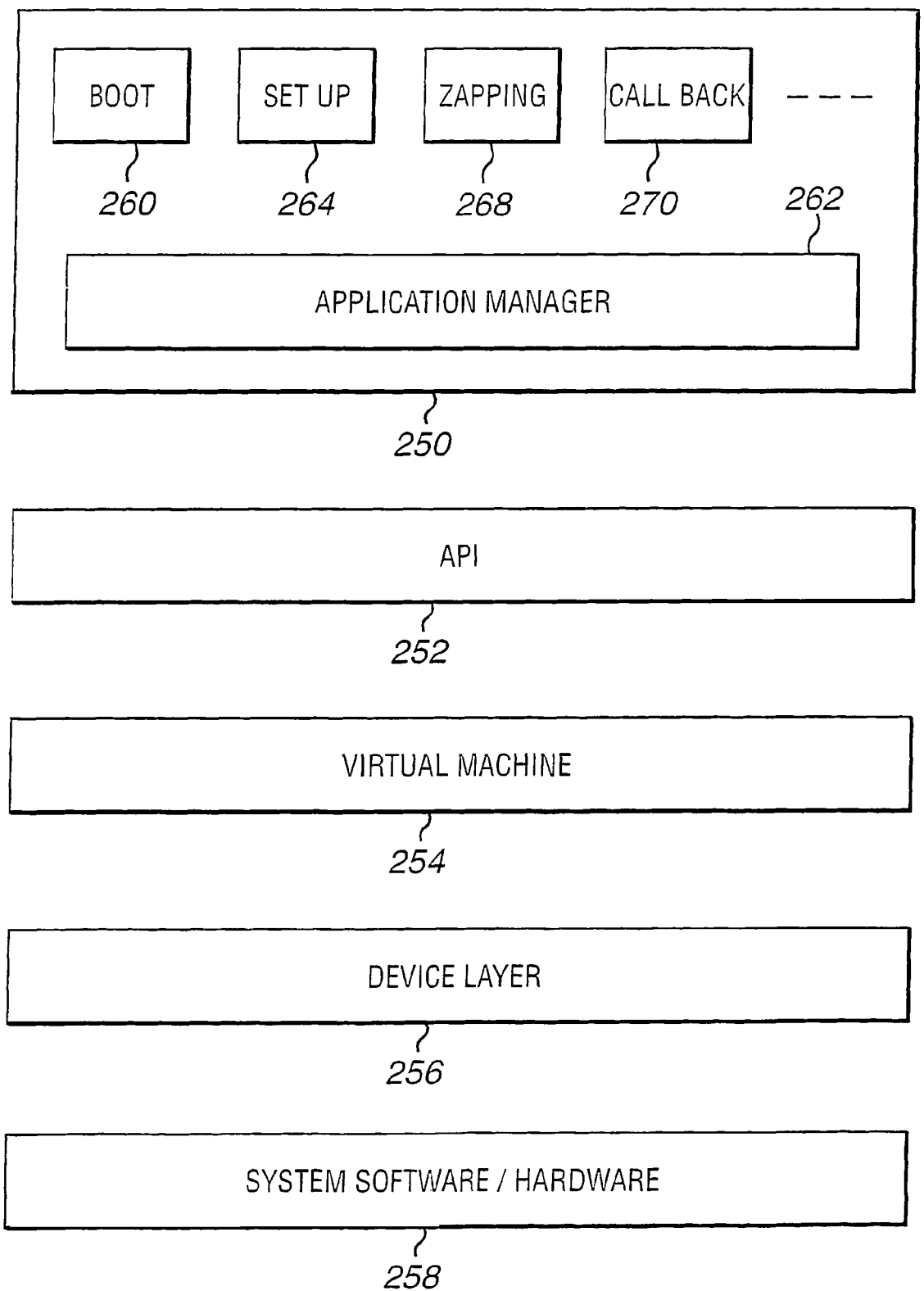
FIG. 6 shows the five software layers contained by the receiver/decoder.

The receiver/decoder contains five software layers, organized so that the software can be implemented in any receiver/decoder and with any operating system. Referring to FIG. 6, the various software layers are Application Layer 250, Application Programming Interface (API) layer 252, Virtual Machine Layer 254, Device Layer 256 and System Software/Hardware Layer 258.

The Application Layer 250 encompasses applications that are either resident in or downloaded to the receiver/decoder. They may be interactive applications used by customers, written in, for example, Java, HTML, MHEG-5 or other languages, or they may be applications used by the receiver/decoder to run such applications. This layer is based on a set of open Application Programming Interfaces (APIs) provided by the Virtual Machine layer. This system allows applications to be downloaded to flash or RAM memory in the receiver/decoder on-the-fly or on demand. The application code can be transmitted in compressed or uncompressed format using protocols such as Data Storage Media Command and Control (DSMCC), Network File Server (NFS) or other protocols.

Interactive applications are applications that the user interacts with, for example, to obtain products and services, such as electronic program guides, telebanking applications and games. The following resident applications are used to manage interactive applications:

Boot. The Boot application 260 is the first application launched when the receiver/decoder is powered on. The Boot application starts the different "Managers" in the Virtual Machine, the first being the Application Manager 262.

Application Manager. The Application Manager 262 manages the interactive applications that are run in the receiver/decoder, that is, it starts, stops, suspends, resumes, handles events and deals with communication between applications. It allows multiple applications to run at once, and thus is involved in the allocation of resources among them. This application is completely transparent to the user.

SetUp. The purpose of the SetUp application 264 is to configure the receiver/decoder, primarily the first time it is used. It performs actions such as scanning for TV channels, setting the date and time, establishing user preferences, and so on. However, the SetUp application can be used at any time by the user to change the receiver/decoder configuration.

Zapping. The Zapping application 268 is used to change channels using the Program-up, Program-down and numeric keys. Then another form of zapping is used, for example, through a banner (pilot) application, the Zapping application is stopped.

Callback. The Callback application is used to extract the values of various parameters stored in the receiver/decoder memory and return these values to the commercial operator via modemmed back channel 17, or by other means.

The API layer 252 provides high-level utilities for interactive application development. It includes several packages that make up this high-level API. The packages provide all the functionality necessary to run interactive applications. The packages are accessible by the applications.

In a preferred embodiment the API is adapted to run applications written in the Java programming language. Furthermore, it can interpret HTML and other formats, such as MHEG-5. Besides these interpreters, it also includes other packages and service modules that are detachable and extensible as requirements dictate.

The Virtual Machine layer 254 is composed of language interpreters and various modules and systems. It consists of everything necessary to receive and execute interactive applications in the receiver/decoder.

The Device Interface layer 256 includes a Device Manager and devices. Devices are software modules which consist of the logical resources necessary for management of external events and physical interfaces. The Device Layer manages communication channels between drivers and applications and provides enhanced error exception checking. Some examples of managed devices are: card readers, modems, network, PCMCIA (Personal Computer Memory Card International Association), LED display and so on. Programmers do not have to deal with this layer directly, since the API layer controls the devices from above.

The System Software/Hardware layer 258 is provided by the manufacturer of the receiver/decoder. Because of the modularity of the system and because services supplied by the OS (such as event scheduling and memory management) are part of the Virtual Machine, the higher layers are not tied to a particular real-time operating system (RTOS) or to a particular processor.

MPEG Systems

Conventional digital television broadcast systems transmit data in the form of discrete transport stream packets or transport packets, each packet being of a predetermined length and containing a header and a body. The MPEG standard is the currently favoured standard in this domain and sets out, amongst other things, a predetermined format for such packets.

The packet header comprises general descriptive data regarding the packet, whilst the body comprises the data to be processed at the receiver/decoder. The packet header includes at least a packet ID or PID identifying the packet. The body of the packet may contain audio, video or other data such as application data or, in particular, conditional access system data.

Conventionally, the incoming data stream is filtered by a receiver/decoder according to the PID of each packet. Data requiring immediate processing such as audio or visual data is communicated to an appropriate processor in the form of what is conventionally known as a packetised elementary stream or PES. This continuous flux of data, which is formed by assembling the bodies of the transport packets, itself comprises a sequence of packets, each PES packet comprising a packet header and body.

Other data not requiring immediate processing may also be encapsulated within the bodies of the transport packets. Unlike PES data, which is treated immediately by a processor to generate a real time output, this sort of data is typically processed in an asynchronous manner by the receiver/decoder processor. In this case, data is formatted in a single table or a series of sections of tables, each including a header and a body, the header of the section or table including a table ID or TID.

Various aspects of a conventional MPEG datastream will now be described with reference to FIGS. 7a, 7b and 7c which are also contained in WO 98/43431, the disclosure of which is incorporated herein by reference.

Referring to FIG. 7a, as is known, the MPEG-2 bitstream includes a programme access table ("PAT") 310 having a packet identification ("PID") of zero. The PAT contains references to the PIDs of the programme map tables ("PMTs") 312 of a number of programmes. Each PMT contains a reference to the PIDs of the streams of the audio MPEG tables 314 and video MPEG tables 316 for that programme. A packet having a PID of zero, that is the programme access table 310, provides the entry point for all MPEG access.

In order to download applications and data for them, two new stream types are defined, and the relevant PMT also contains reference to the PIDs of the streams of application MPEG tables 318 (or sections of them) and data MPEG tables 320 (or sections of them).

Referring to FIG. 7b, in order to download an application 322, the application is divided into modules 324 each formed by an MPEG table, some of which are made up by a single section 318, and others of which may be made up by a plurality of sections 318. A typical section 318 has a header 326, which includes a one-byte table identification ("TID") 328, the section number 330 of that section in the table, the total number 332 of sections in that table and a two-byte TID extension 334. Each section also includes a data part 336 and a CRC 338. For a particular module/table 324, all of the sections 318 making up that table 324 have the same TID 328 and the same TID extension 334. For a particular application 322, all of the tables 324 making up that application 322 have the same TID 328, but different respective TID extensions.

Figure 7C:
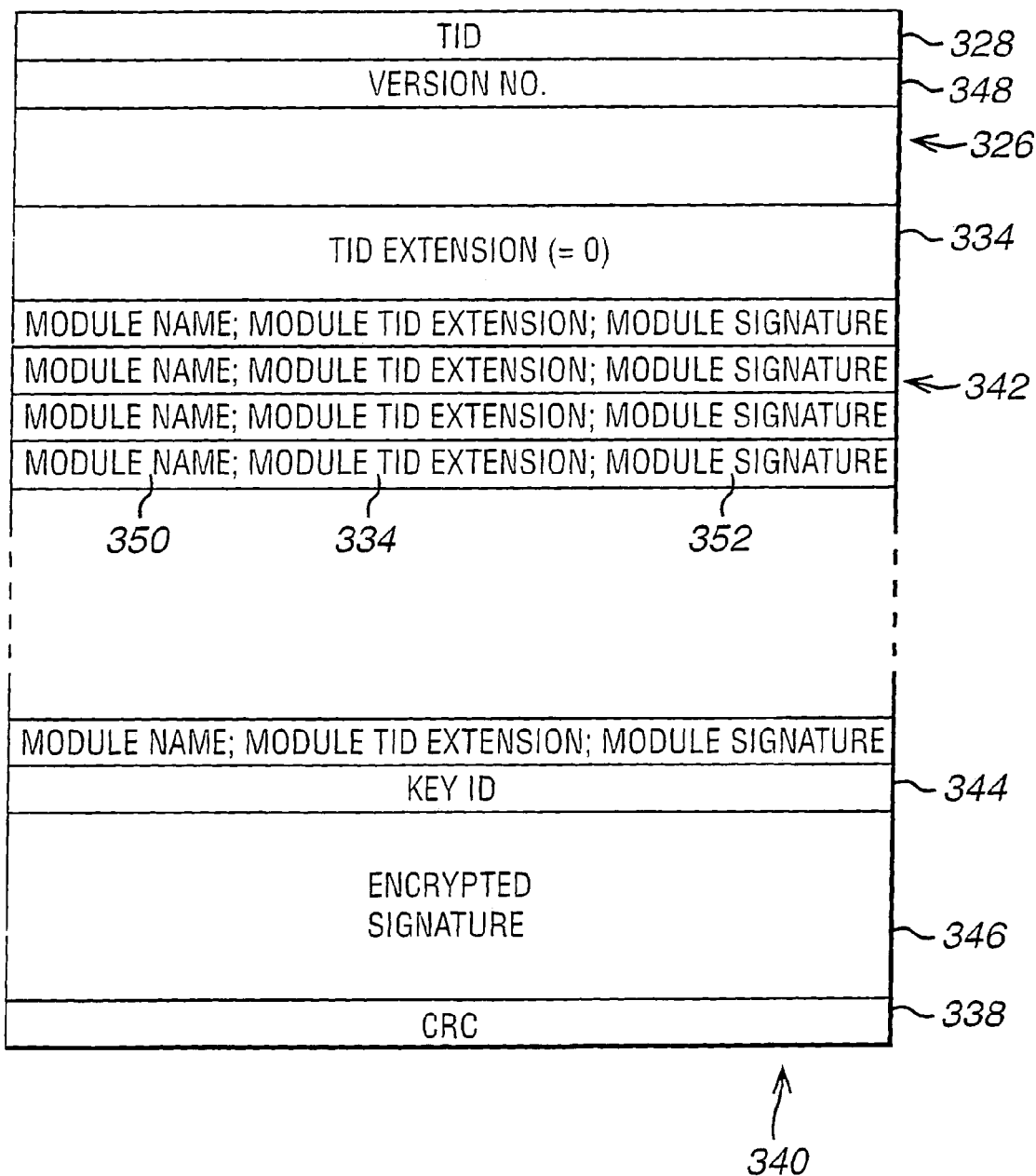
FIG. 7c illustrates the content of a directory module.

For each application 322, there is a single such MPEG table 324 which is used as a directory, and which is shown in greater detail in FIG. 7c. The directory table 340 includes a header 326, a directory part 342, a key identification 344, an encrypted signature 346 and a CRC 338. From the above, it will be appreciated that the directory table 340 has, in its header 326, the same TID 328 as the other modules/tables 324 making up the application. However, the directory table has a predetermined TID extension 334 of zero, and all of the other modules 324 have non-zero TID extensions. The header also includes a version number 348 for the directory table 340. The directory part 342 includes, for each of the other modules/tables 324 making up the application 322, the name 350 of that module, the TID extension 334 for that module, and a signature 352 of that module. The directory part 342 may also include, for each of the other modules/tables 324, the length of that module and the version number of the module.

Referring back to FIG. 7a, in operation, the PAT 310, PMTs 312 and application and data stream components 318, 320 are cyclically transmitted, being updated as necessary. Each application which is transmitted has a respective predetermined TID 328. To download an application, the MPEG table having the appropriate TID and a TID extension of zero is downloaded to the receiver/decoder 13. This, therefore, is the directory table 40 for the required application. The data in the directory is then processed by the receiver/decoder 13 to determine the TID extensions 334 of the module tables making up the required application, and then any required module table having the same TID as the directory table and a TID extension determined from the directory can be downloaded.

The receiver/decoder 13 is arranged to check the directory table for any updating of it. This may be done by downloading the directory table again periodically, for example every 30 seconds, or one or five minutes, and comparing the version number of the freshly downloaded directory table with the version number of the previously downloaded directory table. If the freshly downloaded version number is later, then the modules associated with the previous directory table, or any such models for which there are later version numbers, are unmounted, and the later modules are downloaded and mounted. In an alternative arrangement, the incoming bitstream is filtered using a mask corresponding to the TID, TID extension and version number, with values set for the TID of the application, a TID extension of zero and a version number one greater than the version number of the currently downloaded directory. Accordingly, an increment of the version number can be detected, and once the detected directory is downloaded and the application is updated, as described above. Further description of such filtering is contained in Patent Application WO 98/43415. If an application is to be terminated, an empty directory with the next version number is transmitted, but without any modules listed in the directory. In response to receipt of such an empty directory, the receiver/decoder 13 is programmed to unmount the application.

In the case where the access to a transmission is to be restricted, for example, in a pay TV system, conditional access data may be included in a table or section broadcast in the transport stream with the transmission. This conditional access data is filtered by the decoder and passed to a portable security module, such as smartcard, inserted in the decoder. The data is then processed by the smartcard in order to generate, for example, a control word subsequently used by the decoder to descramble a transmission.

One problem lies in the volume of data that will be received and processed by the decoder and notably the volume of conditional access data eventually forwarded to the security module. In particular, the processing capabilities of a security module processor and the capacity of the communication channel between the decoder and security module may be insufficient to handle a given volume of messages. This problem is exacerbated by the increasing tendency for programmes to be transmitted with multiple conditional access messages enabling access by different operators to the same programme (for example, a football match or a thematic television channel). Hence, a way of decreasing or at least better managing the information broadcast will be investigated presently.

A private MPEG table section is shown below in Table 1. This format is used uniquely to put raw data into MPEG sections. The maximum number of sections is dependent upon the section_syntax_indicator.

TABLE 1

| Name | Size (Bits) | Format | Default value |
|---|---|---|---|
| private_section( ) { | | | |
|   table_id | 8 | uimsbf | |
|   section_syntax_indicator | 1 | bslbf | |
|   private_indicator | 1 | bslbf | |
|   Reserved | 2 | bslbf | |
|   private_section_length | 12 | uimsbf | |
|   if (section_syntax_indicator == '0') { | | | |
|     For (i=0;i<N;I++) { | | | |
|       Private_data_byte | 8 | bslbf | |
|     } | | | |
|   } | | | |
|   else { | | | |
|     Table_id_extension | 16 | uimsbf | |
|     Reserved | 2 | bslbf | |
|     Version_number | 5 | uimsbf | |
|     Current_next_indicator | 1 | bslbf | |
|     Section_number | 8 | uimsbf | |
|     Last_section_number | 8 | uimsbf | |
|     For (i=0;i<private_section_length-9;i++) { | | | |
|       private_data_byte | 8 | bslbf | |
|     } | | | |
|     CRC_32 | 32 | rpchof | |
|   } | | | |
| } | | | |

Table 1 represents both a long table data structure, and a short table section structure, as a variant data structure represented by an if/else statement. In other words, if section_syntax_indicator is equal to 0, then the table will haze a short table data structure, otherwise the table will have a long table data structure. A short table consists of a single section only, whilst a long table may consist of multiple sections.

Figure 8:
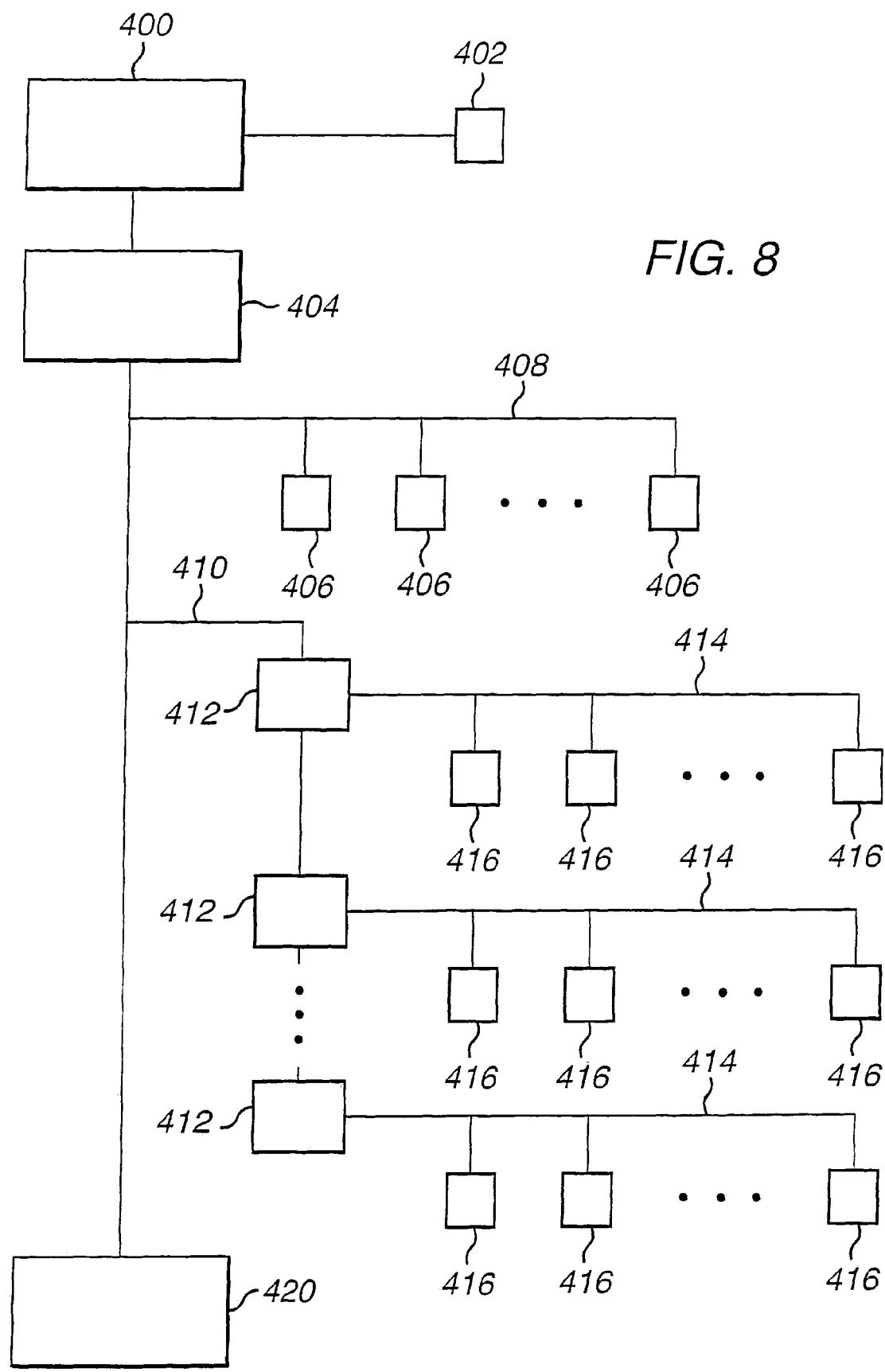
FIG. 8 shows a data structure according to an embodiment of the invention.

In two embodiments of the invention described below, structured information replaces the raw data portions of both the long and short table section data structures, yielding new data formats for both. The raw data portion is represented in Table 1 by the loop of private_data_byte fields and will also be referred to as the section body. The structure of these embodiments is shown as a generic data structure in FIG. 8.

The data structure comprises a conventional MPEG private table section header 400. The table_id_extension field 402 of the conventional header 400 is used in some embodiments to provide application-specific filtering capabilities. For example, it may be used as an identifier for the table content to enable fast retrieval of that content using hardware filtering. The conventional CRC information 420 is retained.

The raw data portion (or body) of the standard MPEG private data section is replaced by further header 404 comprising additional header fields, plus a structured data portion. The additional header fields in further header 404 include information concerning compression and encryption of tables, priority, parsing format and a filter extension field. They also include a field specifying the size of the common attribute list 408. The common attribute list 408 comprises attributes 406 which are common to all data items 412 in the data item list 410. The structured data portion further comprises a variable-length list 410 of data items 412, each including a general purpose data item identifier and a variable-length list 414 of attributes 416 specific to that data item. The length of the specific attribute lists 414 is specified in the data items 412. Attributes 416 in the item-specific attribute lists 414 may override the same common attributes 406 in the common attribute list 408.

This structure enables attributes common to all data items to be included only once. Furthermore, attributes common to some data items may appear in the common attribute list, with those data items with values different to these common attributes including overriding specific attributes. This enables the space required by the formatted data to be kept to a minimum.

Attributes will in the following also be referred to as descriptors in line with MPEG standard terminology. Lists will likewise also be referred to as loops as loop constructs will be used as formalisms in defining lists in specific table format definitions given later. Therefore, attribute lists 408 and 414 will also be referred to as descriptor loops, or common and specific descriptor loops respectively. Loop 410 will also be referred to as identifier loop.

Specific examples may also give specific names to any of the data structure elements.

A descriptor in itself may be an arbitrary data structure depending on the attribute to be represented. Preferably, it will contain a simple header containing a descriptor tag and a descriptor size to enable automatic parsing of the descriptor.

By encapsulating the further header as well as the structured data within the raw data portion or body of the existing table structure of Table 1, compatibility with the existing structure is maintained. This also gives compatibility with existing MPEG table handling hardware and software.

The private table sections will usually be generated at the broadcast centre, where information will be formatted according to the structure described above. Once the data structures have been assembled in a memory at the broadcast centre, they are inserted into an MPEG stream and broadcast to receiver/decoders. A receiver/decoder may then retrieve the information from the MPEG stream and recreate the data structures in its memory before passing them to a parser for further processing as will be described below.

A specific example of a long private table section is given by Table 2 below. Such a table may consist of up to 256 sections. The table gives field names, field sizes in bits, the binary data format and default values. The binary data format is given using the mnemonics defined in the MPEG standard.

TABLE 2

| Name | Size (bits) | Format | Default value |
|---|---|---|---|
| Long_Private_C+_section( ) { | | | |
|     Table_id | 8 | Uimsbf | |
|     Section_syntax_indicator | 1 | Bslbf | 1b |
|     Private_syntax_indicator | 1 | Bslbf | 1b |
|     ISO reserved | 2 | Bslbf | 11b |
|     Section_length | 12 | Uimsbf | Max value = 0xFFD |
|     Tid_extension | 16 | Uimsbf | Tid_ext |
|     Reserved | 2 | Bslbf | 11b |
|     Version_number | 5 | uimsbf | |
|     Current_next_indicator | 1 | Bslbf | 1b |
|     Section_number | 8 | uimsbf | |
|     Last_section_number | 8 | uimsbf | |
|     Private_filter_extension | 16 | uimsbf | |
|     Data_Parsing_Format | 8 | uimsbf | See explanation |
|     Priority | 2 | Bslbf | 11b |
|     Data_Cyphered_flag | 1 | bslbf | |
|     Data_Compressed_flag | 1 | bslbf | |
|     Data_Cyphering_Algorithm | 2 | uimsbf | See explanation |
|     Data_Compressing_algorithm | 2 | uimsbf | See explanation |
|     Reserved | 4 | Bslbf | 1111b |
|     Common_Descriptor_info_length | 12 | uimsbf | N1 |
|     for (i=0, i<N1, i++) { | | | |
|         Descriptor( ) | | | |
|     } | | | |
|     for (i=0, i<N2, i++) { | | | |
|         Extra_Identifier_length | 8 | uimsbf | N |
|         Extra_Identifier | 8*N | uimsbf | |
|         Reserved | 4 | bslbf | 1111b |
|         Extra_Identifier_descriptor_length | 12 | uimsbf | N3 |
|         For (i=0, i<N3, i++) { | | | |
|             Descriptor( ) | | | |
|         } | | | |
|     } | | | |
| } | | | |

TABLE 2-continued

| Name | Size (bits) | Format | Default value |
|---|---|---|---|
| CRC_32 | 32 | Rpchof | |
| } | | | |

Max. number of sections: 256
Max. size for each section: 4096

The fields between, but excluding, last_section_number and CRC_32 replace the raw, unformatted data section of the existing table format of Table 1. The new fields are now described, with the exception of reserved fields.

Private_Filter_extension: In order to optimize the use of hardware filters, this 16-bit field may be used to extend private filtering by including further criteria in the portion of the header on which hardware filtering is performed, for example with MLOAD_table, MLOAD_group or MLOAD_ section calls.

Data_Parsing_Format: This 8-bit field indicates the data parsing format of the following data in the table. This helps automatic parsing if the format of the following data is changed in a future version. This field can be interpreted as being equivalent to the table format version number modulo 256 in the case that more than 256 parsing formats are required. In that case a further header field may be introduced in a new table format for the purposes of specifying the parsing format.

Data_Cyphered_flag: This flag indicates whether the data in the data portion or body, that is to say, the data between but excluding the further header and the CRC_32 field, is enciphered or not. If the data is enciphered then the selection of ciphering algorithm is made with the help of the Data_Cyphering_Algorithm field.

Data_Compressed_flag: This flag indicates whether the data in the data portion or body, that is to say, the data between but excluding the further header and the CRC_32 field, is compressed or not. If the data is compressed then the selection of compression algorithm is made with the help of the Data_Compressing_Algorithm field.

If both Data_Cyphered_Flag and Data_Compressed_Flag are set, then enciphering is performed after compression of the data. On the reception side, the receiver/decoder 13 deciphers before decompressing.

Data_Cyphering_Algorithm: This 2-bit field allows for one of four different algorithms to be specified for use in en-/deciphering the data in the section body.

Data_Compressing_algorithm: This 2-bit field allows for one of four different algorithms to be specified for compression of the data in the section body.

Priority: One of four priority levels may be specified in this 2-bit field, which enables a priority level to be associated with the private data. Value 0 represents the highest priority level and value 3 represents the lowest priority level.

Common_Descriptor_info_length: This specifies the length of the following common descriptor list as size in bytes (though the number of elements could also be used to give the length).

Descriptor list: This is a list of Descriptor elements. Descriptor elements may be of varied internal structure and represent data element attributes. The list is represented in Table 2 by a loop construction.

Extra identifier list: This list is represented in Table 2 by a loop construction. This list may contain zero or more extra identifiers, each with a descriptor list. Each element of an extra identifier comprises the following fields:

Extra_Identifier_length: This S-bit field specifies the number (N) of bytes used for the variable-length Extra_identifier field.

Extra_Identifier: This 8*N-bit field specifies an identifier or a group of identifiers describing the following Extra identifier descriptor loop.

Extra identifier descriptor loop: This is a list of Descriptor elements. Descriptor elements may be of varied internal structure and represent data element attributes. This list is represented in Table 2 by a loop construction.

In Table 1 above, the field private_section_length specifies the size of the remaining portion of the private section from the next field until the end of the section. The same function is performed by the Section_length field in Table 2. In Table 2, the lengths of the two descriptor loops (as size in bates, although the number of descriptors could also be used) are additionally specified by the fields Common_Descriptor_info_length (default value N1) and Extra_Identifier_descriptor_length (default value N3).

An embodiment in the form of a short private table is given in Table 3 below. A short private table consists of only a single section.

TABLE 3

| Name | Size (bits) | Format | Default value |
|---|---|---|---|
| Short_Private_C+_section( ) { | | | |
|     Table_id | 8 | Uimsbf | |
|     Section_syntax_indicator | 1 | Bslbf | 0b |
|     Private_Syntax_indicator | 1 | Bslbf | 1b |
|     ISO reserved | 2 | Bslbf | 11b |
|     Section_length | 12 | Uimsbf | Max value = 0xFFD |
|     Private_Filter_Extension | 56 | uimsbf | |
|     Data_Parsing_Format | 8 | uimsbf | See explanation |
|     Priority | 2 | Bslbf | 11b |
|     Data_Cyphered_flag | 1 | bslbf | |

TABLE 3-continued

| Name | Size (bits) | Format | Default value |
|---|---|---|---|
| Data_Compressed_flag | 1 | bslbf | |
| Data_Cyphering_Algorithm | 2 | uimsbf | See explanation |
| Data_Compressing_algorithm | 2 | uimsbf | See explanation |
| Reserved | 4 | Bslbf | 1111b |
| Common_Descriptor_info_length | 12 | uimsbf | N1 |
| for (i=0, i<N1, i++) { | | | |
|     Descriptor( ) | | | |
| } | | | |
| for (i=0, i<N2, i++) { | | | |
|     Extra_Identifier_length | 8 | uimsbf | N |
|     Extra_Identifier | 8*n | uimsbf | |
|     Reserved | 4 | bslbf | 1111b |
|     Extra_Identifier_descriptor_length | 12 | uimsbf | N3 |
|     for (i=0, i<N3, i++) { | | | |
|         Descriptor( ) | | | |
|     } | | | |
| } | | | |
| } | | | |

Max section number: 1
Max size for each section: 4096

The fields between, but excluding, Section_length and CRC_32 replace the raw, unformatted data portion—or body—of the existing table format. The new fields are now described, with the exception of reserved fields and the fields described above with reference to Table 2.

Private_Filter_extension: In order to optimize the use of hardware filters, this 56-bit field may be used to extend private filtering by including further criteria in the portion of the header on which hardware filtering is performed with MLOAD_table, MLOAD_group or MLOAD_section calls. This filter extension field is longer than the equivalent field in the short long format (see Table 2). This is to make the headers of both formats equal in size, which makes parsing of tables easier.

Priority: One of four priority levels may be specified in this 2-bit field, which enables a priority level to be associated with the private data. Value 0 represents the highest priority level and value 3 represents the lowest priority level.

Common_Descriptor_info_length: This specifies the length of the following common descriptor list as size in bytes (though the number of elements could also be used to give the length).

Descriptor list: This is a list of Descriptor elements. Descriptor elements may be of varied internal structure and represent data element attributes. The list is represented in Table 3 by a loop construction.

Extra identifier list: This list is represented in Table 3 by a loop construction. This list may contain zero or more extra identifiers, each with a descriptor list. Each element of an extra identifier comprises the following fields:

Extra_Identifier_length: This specifies the number of bytes used for the variable-length Extra_Identifier field.

Extra_Identifier: This specifies an identifier or a group of identifiers describing the following descriptor loop.

Extra identifier descriptor loop: This is a list of descriptor elements. Descriptor elements may be of varied internal structure and represent data elements. This list is represented in Table 3 by a loop construction.

The above examples of both long section and short section formats provide additional header fields related to compression an encryption. These provide for the ability to both encrypt and compress the formatted data portion and part of the additional header information. A description of compression and encryption of section bodies is given below. Also, a Priority field is provided to enable prioritisation of information contained in private table sections.

The private table formats described may be used in many different application, for example to pass instructions to a set top box; in a Video-on-Demand application; or in a conditional access system. Some of these examples will be described in more detail later.

The Parser

To interpret the generic table structure described above, a parser is provided as part of the operating software of the set top box. The construction of such a parser given the defined data structures can easily be carried out by a person skilled in the art. Therefore, only some basic requirements will be outlined here.

Figure 9:
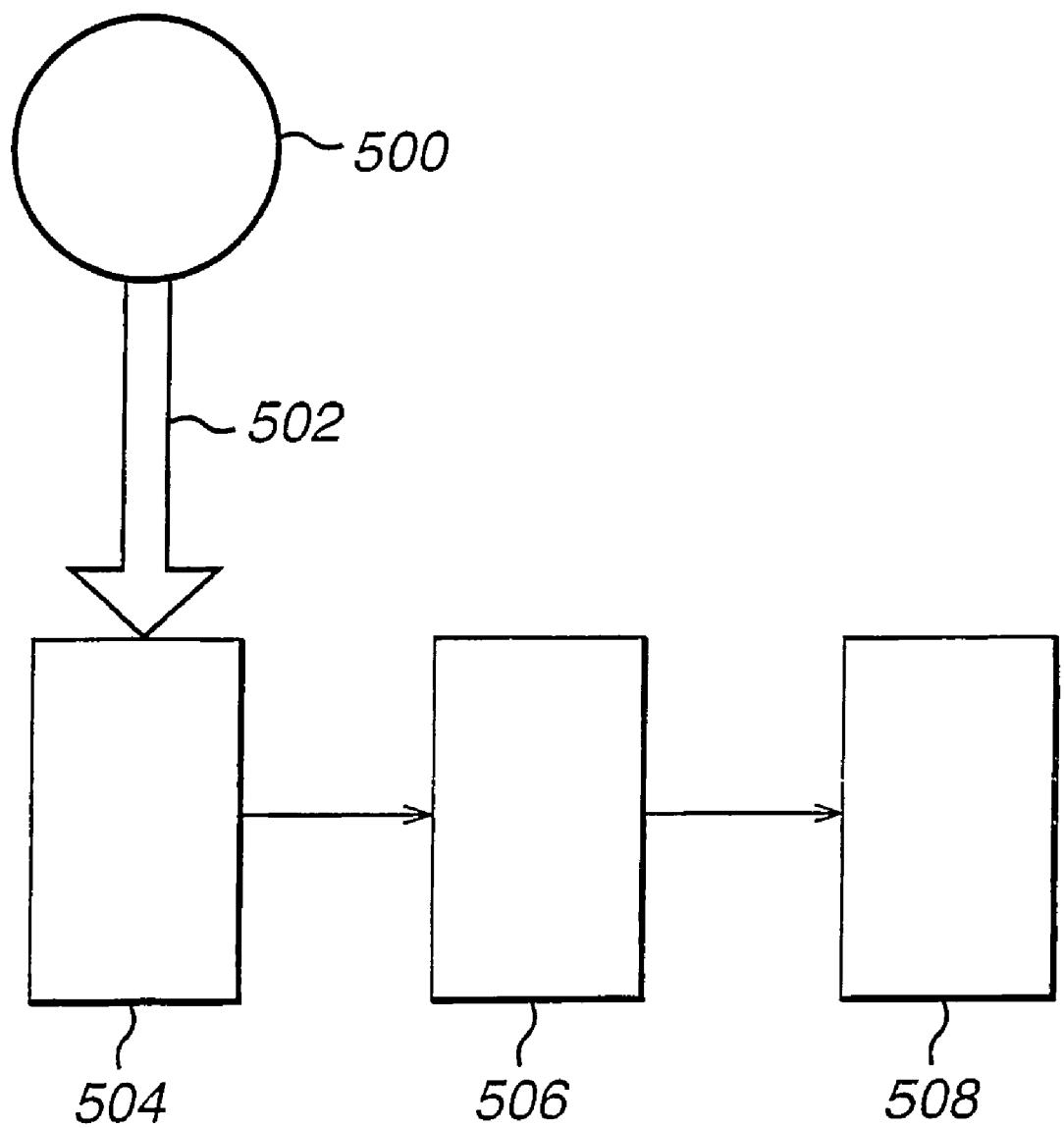
FIG. 9 shows the role of the parser within the set top box.

The role of the parser is shown in FIG. 9. The parser layer 506 comprising a parser provides a layer of abstraction between the application layer 508 and the MPEG table reception and filtering layer 504, which extracts information sent by the broadcast system 500 via data stream 502.

The effect of this abstraction is that the different applications do not have to be specifically adapted to a large number of different table formats for the different kinds of data they deal with. The parser processes the received table sections and extracts the relevant information, passing it on to an application in the application layer.

The generic table format described above allows for different types of data to be organized within the same table structure. Individual data items, stored in a table section as collections of common and specific attribute descriptors contain the information required by an application. Descriptor formats may vary, a simple header, in the above examples comprising a tag specifying the type of information and a size attribute, is provided to enable the parser to correctly extract the information and pass it on to an application.

Furthermore, the sizes of descriptor lists are provided in the form of the Common_Descriptor_info_length field and the Extra_Identifier_descriptor_length field to enable the parser to accurately extract them. The parser does not need to concern itself with the meaning or function of individual data items; it simply passes the data on to an application. The parser therefore does not need to be aware of the different types of information it may receive; the interpretation of the information is performed by the application. The parser merely strips the transmission-related information contained in the header and passes the actual data content of tables to the application in a suitable, generic form.

Thus, the parser is able to process different types of tables, of variable length. The design of the parser is governed only by the design of the general purpose tables, not by the different types of information used by the different applications.

To allow for further table section formats, the current format provides a parse format field (Data_Parsing_Format). The header section before this field remains constant in size in all table format's so that the parser can correctly identify the field, which it uses to determine the format of a private table section and thus choose the appropriate strategy for parsing it.

Compression and Encryption of Private Tables

The table format as described above also provides for compressed and/or encrypted private tables. Compression of private tables may be useful when the tables are used to transport large amounts of information, for example the programme catalogue in a Video-on-Demand application. Bandwidth in digital broadcast systems is often expensive, and therefore reducing the required bandwidth can be of benefit. Encryption of tables may be useful if the information stored in the tables is of a confidential nature, for example conditional access information.

The compression of private tables will now be described.

The further header as defined previously (see Table 2) includes two compression-related fields. The Data_Compressed_flag flag is used to indicate whether or not the data in the private table section is compressed. Furthermore, the Data_Compressing_Algorithm field in the further header allows the algorithm used for compression to be specified. The system can therefore use a number of different compression algorithms at the same time. In the embodiment described by Table 2, this is a 2-bit field; 4 algorithms may therefore be specified.

In a preferred embodiment described below, the standard header and footer, as well as the further header including the above-named fields, are not compressed, so that the compressed table may be processed and transmitted using standard MPEG hard- and software, and so that the receiver may determine whether a table has been compressed and which algorithm was used to compress it. Only the body (or data portion) of the MPEG private table is compressed. In other examples, everything between (but excluding) the compression-related fields of the further header and the footer is compressed, including some fields in the further header.

In some embodiments, section bodies are simply compressed individually. The table as a whole then retains the same number of sections after compression.

In a preferred embodiment, however, the section bodies of all table sections are extracted from the table sections and assembled to form a large data block. To enable the original table sections to be recreated after decompression, each body in the block is preceded by a specifier giving its length.

This intermediate data block, comprising all section bodies together with their respective lengths, is then compressed to give a new, compressed, data block. A new private MPEG table is then created from this block by splitting it into a number of segments, each of which is placed in the body of a section of the new table. The compression flags in the further headers of each new table section are set accordingly. Apart from these flags and the fields relating to section numbers and sizes, the MPEG standard and further headers otherwise remain the same as in the original table. The compressed table can therefore be handled in the same way as the original uncompressed table.

The compressed table will usually (depending on the achieved compression ratio) contain less sections than the original table, as the amount of data to be transmitted has been reduced by compression.

This compressed private table is then transmitted via the usual channel. When received, the Data_Compressed_flag indicates that the table is compressed, while the Data_Compressing_Algorithm field gives the algorithm used for compression and thus indicates to the receiver/decoder which algorithm should be used for decompression.

The receiver/decoder then extracts the bodies from each of the compressed table sections and re-assembles it to form the original compressed data block. This is decompressed, and then, with the help of the length specifiers, disassembled into its constituent section bodies. These decompressed bodies are then used to recreate the original private table sections and hence the original private table.

The advantage of compressing a large block of data constructed from all section bodies, rather than compressing each section body individually, is that a higher compression ratio may be achieved. Also, the number of sections to be transmitted may be reduced. Thus, both bandwidth and computational overhead required for transmission of the compressed private table is also reduced.

Compression and decompression will now be described in more detail with reference to FIGS. 11A and 11B.

Figure 11A:
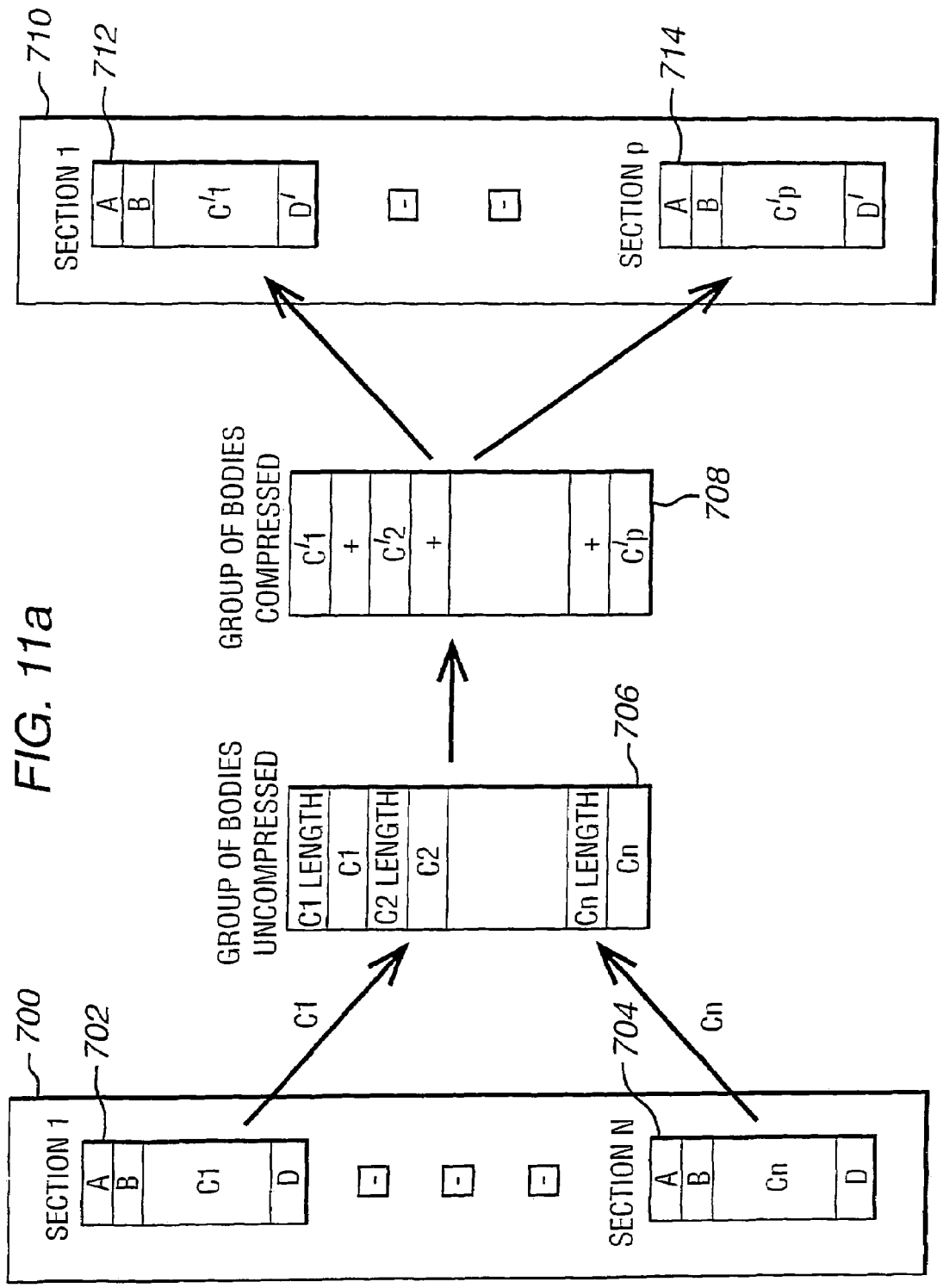
FIG. 11A illustrates the compression of a private table.

Referring first to FIG. 11A, private MPEG Table 700 comprises N private table sections 702 through to 704. Each table section comprises a standard MPEG private table section header A, a further header B, a body C1 to Cn, and a footer D. In some embodiments, the table section structure is as defined previously in Table 2 or Table 3, though other specific structures are possible. In other examples, the further header contains other fields in addition to or instead of the fields given in Tables 2 and 3, or omits such fields. Also, in the long table format embodiment the footer provides a CRC checksum. In the short table format embodiment the footer is omitted.

To compress table 700, section bodies C1 to Cn are extracted from table sections 1 to N. The length of each body is determined, and a data block 706 is created by assembling the bodies and preceding each body with a size specifier specifying the length of that body. The data block then comprises section bodies C1 to Cn, each preceded by their respective size specifier C1_length to Cn_length. The inclusion of the size specifiers enables the section bodies to be correctly extracted after decompression. As the section length fields in both long and short table formats (as described above in Tables 2 and 3 respectively) are 12 bit fields, two byte length specifiers are sufficient in this example. The four unused bits of each two byte length specifier are set to 1.

Data block 706 is then compressed using any suitable compression algorithm. This results in compressed block 708.

A compressed MPEG private table 710 is then produced from compressed block 708 in the following manner. Compressed block 708 is split into a number of segments C'1 to C'p. Each segment is then placed in a section of table 710 as section body. Compressed table 710 then comprises P table sections 712 to 714 containing segments C'1 to C'p of compressed datablock 708.

Compressed table 710 may then be transmitted or stored. The compressed table is compatible not only with the MPEG standard private table, but also with the generic private table format as described above and can therefore be processed in the same way.

Compressed table 710 will typically (though not necessarily) have less sections than the original uncompressed table 700 as the amount of data stored in the compressed table has been reduced through compression; and the compressed data has then been redistributed, preferably evenly. Therefore, transmission of the table is made more efficient by not only reducing the total amount of data transmitted, but also by reducing the number of table sections transmitted. Also, by compressing all section bodies together rather than individually, a higher compression ratio may be achieved.

Turning now to FIG. 11B, compressed MPEG private table 710 is decompressed in the following manner. Section bodies C'1 to C'p are extracted and assembled to give compressed data block 716, which is then decompressed using the appropriate decompression algorithm. This results in the original uncompressed data block 718 comprising original section bodies C1 to Cn with their respective size specifiers. Using the size specifiers, data block 718 is then split into its original constituents, namely section bodies C1 to Cn, and-the original, uncompressed private MPEG table 720 having table sections 722 to 724 is reconstructed from these section bodies.

The same procedure as described above for compression of tables is used to encrypt private tables. For this purpose, the further header provides two fields Data_Cyphered_Flag and Data_Cyphering_Algorithm. These are analogous to the compression-related fields of similar names; the first is a flag indicating whether or not a table is encrypted, whilst the second may optionally be used to specify the encryption algorithm used and the decryption algorithm required for decryption (in other examples, this field could also be used to specify one of several encryption keys, those keys having been conveyed to the receiver previously). Any suitable encryption algorithm may be used, for example, DES or RSA. As with compression, in some embodiments encryption is performed on table sections individually, but in the preferred embodiment described here, is performed on a data block comprising all table section bodies with size specifiers. This latter technique may provide increased security as the table structure is not retained. The procedure for encrypting a table is then analogous to the compression method described above. In fact, the technique may be used with any operation or transformation. Transformations in the form of compression and encryption have been described here as examples.

Furthermore, tables may be both encrypted and compressed. In this case, data block 706 as shown in FIG. 11A is first compressed and then encrypted. At the receiver, the compressed and encrypted table is then first decrypted and then decompressed (in another example, the table is first encrypted then compressed, and at the receiver, the encrypted, compressed table is first decompressed, then decrypted).

At the receiver/decoder, decompression and decryption are performed as a first stage by the parser module. In an alternative embodiment, they are performed separately and before the table is passed to the parser. Since decompression and decryption result in the creation of a second private table from the transmitted compressed and/or encrypted private table, the memory occupied by the transmitted table is released once the decompressed/decrypted table has been generated, as the compressed/encrypted table is then no longer needed. The receiver/decoder generates a table descriptor when the table is received comprising information on the table structure and pointers to the table sections. The table descriptor is used to remove the compressed/encrypted table from memory. A new table descriptor is then created for the decompressed/decrypted table, which may, for example, be passed to another software module to enable the software module to access the decompressed/decrypted table.

The decompression/decryption module detects whether a table is compressed and/or encrypted by inspecting the Data_Compressed_flag and Data_Cyphered_flag. If either of these are set, the appropriate decompression and/or decryption algorithm are selected based on the value of the Data_Compressing_Algorithm and Data_Cyphering_Algorithm fields. Decompression and/or decryption are then performed before further parsing occurs.

Compression and encryption of tables is therefore transparent to the applications, and, to a large extent if not wholly, the parser. Since the MPEG standard header remains unchanged in the compressed and/or encrypted table and the standard MPEG private table section structure is therefore retained, compression encryption is also transparent to the lower-level MPEG compliant modules concerned with transmission, reception and filtering of MPEG tables. At the receiver/decoder, compressed and/or encrypted tables are retrieved from the incoming stream using standard filtering methods, for example by filtering on the table ID and, table ID extension fields. Ease of access to compressed/encrypted information in MPEG streams is therefore maintained.

The compression/encryption technique has here been described in the context of the generic MPEG private table structure discussed previously and exemplified in Tables 2 and 3. However, it is also applicable to standard MPEG private tables, which may be compressed and encrypted using the same technique. In some such examples, flag attributes such as those described are simply added at the start of the private table section bodies. In other examples such flags are not required if a previous agreement exists between sender and receiver on the compressed or encrypted state of the private table section bodies. The technique is also applicable to other similar data structures which are not MPEG private tables.

APPLICATION EXAMPLES

The embodiments described above may be used in a number of different applications. Some examples of such applications will now be given.

The first example provides a means for informing a set top box of actions to be carried out by the set top box.

Application Example: Action Notification Table

The action notification table (ANT) is based on the general-purpose table structure previously discussed. It may me used to instruct a set top box, or group of set top boxes, to carry out a particular action.

Examples of actions to be carried out by the receiver/decoder include the downloading of software; automatic channel scanning; rebooting of the receiver/decoder; refreshing programme catalogues (such as a video-on-demand catalogue); and displaying a message to the user of the set top box (audience messaging). The Table ID extension field is used in the ANT to identify the action required.

An ANT may be targeted at set top boxes of a particular kind (for example, from a particular manufacturer) or even individual set top boxes by means of targeting descriptors.

These may, for example, be placed in the common descriptor loop of the ANT table. By processing the targeting descriptors in the common descriptor loop, a set top box may determine whether the action is to be carried out by that set top box. This processing of the targeting and action information may, for example, be carried out by an application programme running on the set top box.

The ANT is a table that carries lists of descriptors and loops in order to support any type of action and selection criteria. There is no limitation for creating new descriptors. Therefore this approach is open to any new evolution. In the section below, the basic structure of the ANT table is described, as well as some basic descriptors required for basic download purposes.

Two table formats are available, a long table with additional header fields allowing for multi-section tables, and a short version allowing for a single-section table. These follow the embodiments of the invention as described above. The long table format is shown below in Table 4a.

TABLE 4a

| Name | Size (bits) | Format | Default value |
|---|---|---|---|
| Action_Notification_section( ) { | | | |
|   Table_id | 8 | Uimsbf | 0x91 |
|   Section_syntax_indicator | 1 | Bslbf | 1b |
|   Private_syntax_indicator | 1 | Bslbf | 1b |
|   ISO reserved | 2 | Bslbf | 11b |
|   Section_length | 12 | Uimsbf | Max value = 0xFFD |
|   Action_Identifier | 16 | Uimsbf | See explanation below |
|   Reserved | 2 | Bslbf | 11b |
|   Version_number | 5 | uimsbf | |
|   Current_next_indicator | 1 | Bslbf | 1b |
|   Section_number | 8 | uimsbf | |
|   Last_section_number | 8 | uimsbf | |
|   Filter_extension | 16 | uimsbf | Following action_id |
|   Data_Parsing_Format | 8 | uimsbf | See explanation |
|   Priority | 2 | Bslbf | 11b |
|   Data_Cyphered_flag | 1 | bslbf | |
|   Data_Compressed_flag | 1 | bslbf | |
|   Data_Cyphering_Algorithm | 2 | uimsbf | See explanation |
|   Data_Compressing_algorithm | 2 | uimsbf | See explanation |
|   Reserved | 4 | Bslbf | 1111b |
|   Common_Descriptor_info_length | 12 | uimsbf | N1 |
|   for (i=0, I<N1, i++) { | | | |
|     Descriptor( ) | | | |
|   } | | | |
|   for (i=0, I<N2, i++) { | | | |
|     Extra_Identifier_length | 8 | uimsbf | N |
|     Extra_Identifier | 8*N | uimsbf | |
|     Reserved | 4 | bslbf | 1111b |
|     Extra_Identifier_descriptor_length | 12 | uimsbf | N3 |
|     for (i=0, i<N3, i++) { | | | |
|       Descriptor( ) | | | |
|     } | | | |
|   } | | | |
|   CRC_32 | 32 | Rpchof | |
| } | | | |

Action_identifier: The table identifier extension field (Tid_ext) is here used for a different purpose, namely to identify an action. Examples of actions and their encoding are given in Table 4b below.

TABLE 4b

| Value | Comment |
|---|---|
| 0x0000 | CDNT MediaOne & Jupiter |
| 0x0001 | Code Download V2 |
| 0x0002 | Automatic Scanning |
| 0x0003 . . . 0xFFFF | RFU |

Filter_extension: The meaning of this field depends on the value of the Action_identifier field. Examples of possible values and meanings are given in Table 4c below.

TABLE 4c

| Action_identifier | Filter_extension | Comment |
|---|---|---|
| 0x0000 | >0x0000 | Message_index |
| 0x0001 | 0xFFFF | Reserved for Automatic download project |
| 0x0002 | TBD | RFU |
| 0x0003 . . . 0xFFFF | TBD | RFU |

A short table format action notification table may be constructed similarly based on the short table format described above.

Some examples of basic descriptors are described below with reference to Tables 4d-4k.

Code_download_descriptor

One descriptor is provided for each code loader available.

The descriptor is placed the item loop inside the ANT table, and defines the code download scheduling.

TABLE 4d

| Name | Size (bits) | Format | Default value |
|---|---|---|---|
| Code_download_descriptor ( ) { | | | |
|   Descriptor_tag | 8 | Uimsbf | Tbd |
|   Descriptor_length | 8 | Uimsbf | |
|   Download_flag | 1 | Bslbf | 0: automatic<br>1: manual |
|   Type | 2 | Bslbf | 0: scheduled<br>1: immediate<br>2, 3: Reserved for future use |
|   Periodicity | 2 | Bslbf | 0: no periodic<br>1: daily<br>2: weekly<br>3: monthly |
|   Reserved | 3 | Bslbf | 111b |
|   UTC_Date_Time_start | 40 | Uimsbf | |
|   UTC_Date_Time_estimated_stop | 40 | Uimsbf | |
| } | | | |

Description of Fields

Download_flag:

TABLE 4e

| Value | Comment |
|---|---|
| 0 | The loader shall not be launched at the next reboot, but downloading parameters shall be updated in the EEPROM.<br>To be taken into account, the download has to be activated manually<br>From front panel key of the STB<br>From Setup menu |
| 1 | The code download shall actually be performed at the next reboot. |

Type: This field defines the STB behaviour when the download process starts

TABLE 4f

| Value | Comment |
|---|---|
| 0 | Immediate download |
| 1 | Scheduled Download |
| 2 | Reserved for future use |
| 3 | Reserved for future use |

A scheduled action enables the STB to program an automatic software download periodically, (for instance once a day for one month at 03:00 am) until this operation is successful.

Periodicity: This field defines the STB behaviour when the download process starts for a scheduled action. This periodicity is only available between the UTC_date_time_start and the UTC_date_time_estimated_stop for a scheduled action.

UTC_date_time_start: This field indicates the scheduled date and time when a forced reboot of the STB shall occur. It is encoded in UTC, in the same format as specified by DVB in the TDT and TOT tables.

UTC_date_time_estimated_stop: This field indicates the date of availability for the code download ANT Extension The ANT can be used for other types of event notification. There are no limitations; the example below describes how to use this solution for another purpose:

Scanning_Descriptor

Using this descriptor, a set top box may be instructed to carry out a scan. This involves obtaining the service map which contains, for example, information on available channels. The scan may be required immediately, or on a scheduled basis.

TABLE 4g

| Name | Size (bits) | Format | Default value |
|---|---|---|---|
| Scanning_descriptor ( ) { | | | |
|   Descriptor_tag | 8 | uimsbf | TBD |
|   Descriptor_length | 8 | uimsbf | |
|   Reserved | 3 | bslbf | |
|   Service_map_version_number | 5 | uimsbf | n |
|   Original_Network_id | 16 | Uimsbf | |
|   Transport_stream_id | 16 | Uimsbf | |
|   Scanning_flag | 1 | Bslbf | 0: automatic<br>1: manual |
|   Type | 2 | Bslbf | 0: scheduled<br>1: immediate<br>2, 3: Reserved for future use |
|   Periodicity | 2 | Bslbf | 0: no periodic<br>1: daily<br>2: weekly<br>3: monthly |
|   Reserved | 3 | Bslbf | 111b |
|   UTC_Date_Time_start | 40 | Uimsbf | |
|   UTC_Date_Time_estimated_stop | 40 | Uimsbf | |
| } | | | |

Description of Fields:

Service_map_version_number: This field identifies the version number of the service map used.

Original_network_id, Transport_stream_id: These DVB values identify the transport stream where the scanning information is broadcast.

Scanning_flag:

TABLE 4h

| Value | Comment |
|---|---|
| 0 | To be taken into account, the scanning has to activated manually<br>From Setup menu |
| 1 | The scanning shall actually be performed at the next reboot. |

Type: This field defines the STB behaviour when the scanning process starts

TABLE 4i

| Value | Comment |
|---|---|
| 0 | Immediate scanning |
| 1 | Scheduled scanning |
| 2 | Reserved for future use |
| 3 | Reserved for future use |

A scheduled action makes it possible to program an automatic scanning periodically (for instance once a day for one month at 03:00 am), until this operation is successful.

Periodicity: This field defines the STB behaviour when the scanning process starts for a scheduled action. This periodicity is only available between the UTC_date_time_start and the UTC_date_time_estimated_stop for a scheduled action.

UTC_date_time_start: This field indicates the scheduled date and time when a forced reboot of the STB shall occur. It is encoded in UTC, in the same format as specified by DVB in the TDT and TOT tables.

UTC_date_time_estimated_stop: This field indicates the date of availability for the scanning service map information.

The Action Notification Table (ANT) may, for example, be used to instruct the set top box to download information.

Downloading data requires three mechanisms: a signalling mechanism; a download mechanism; and a bootstrap mechanism. In the following description, the signalling mechanism is based on the use of a link-age descriptor within the NIT (Network Information Table) or the BAT to a PMT. The PMT (introduced above in FIG. 7a) is a table carrying all information necessary for the data download and identifying the location of the download stream.

The download process may require a large variety of different types of information depending on which operator, network and set-top-box (STB) manufacturer is to be used. Therefore, a very open and flexible table concept is required.

A platform is identified at a first level by an OUI identifier. The OUI identifier indicates a particular STB manufacturer. At a second level, precise targeting is left open in order to use various parameters like Serial Number, Mac address, Smart-Card number linked to a CAS_ID, etc. Additional hardware or software versions and sub-versions are allowed. The solution described below allows any type of discrimination descriptor to be used for filtering.

Figure 10:
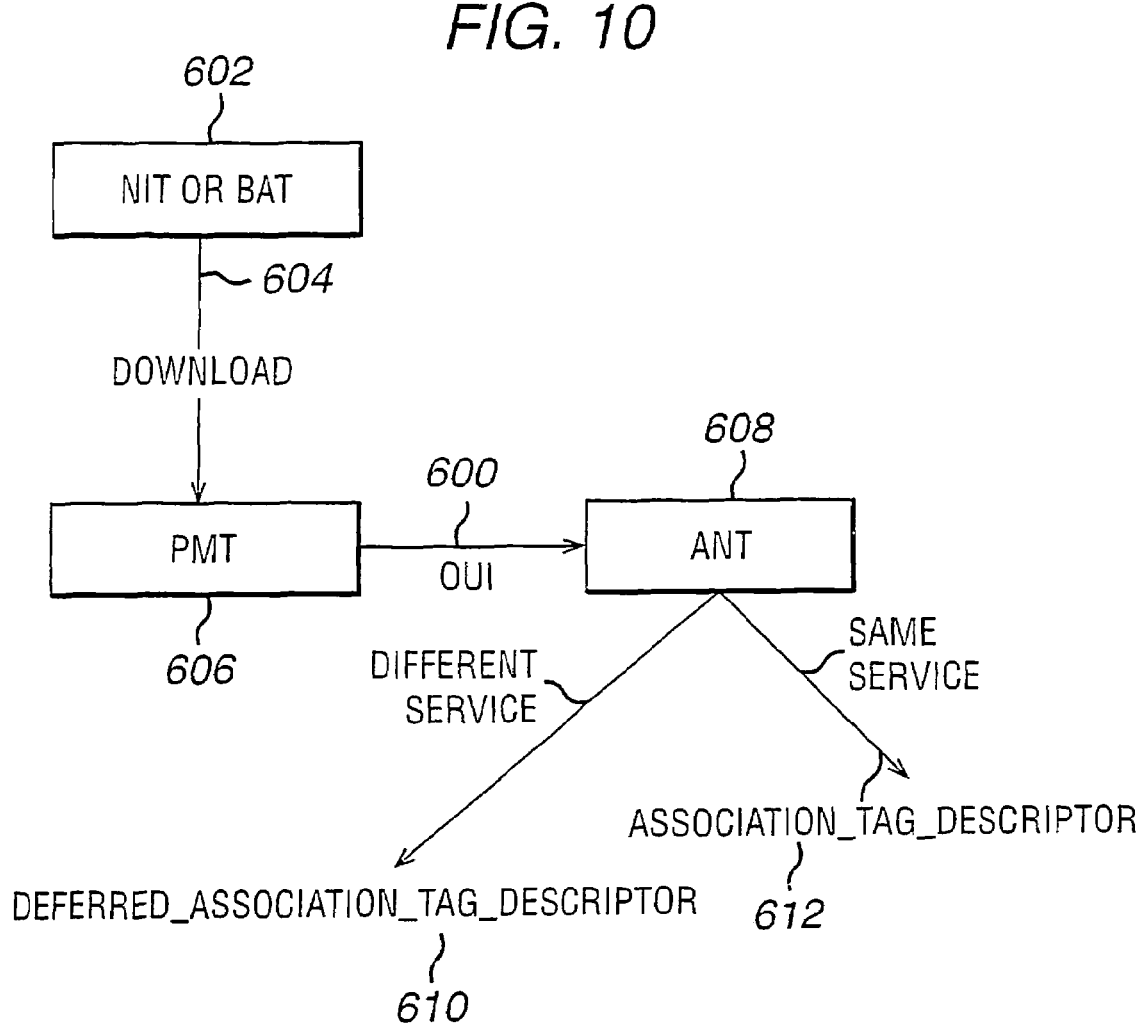
FIG. 10 illustrates the selection of an Action Notification Table.

As shown in FIG. 10, the signalling of a download service is based on a linkage descriptor in the NIT or the BAT 602 to a PMT 606. In service_descriptor of SDT (Service Description Table) as well as service_list_descriptor of NIT, a service type "DOWNLOAD" is defined (in order to avoid download services appearing as programs on the screen) to declare this specify service.

The PMT 606 references an ANT (Acketion Notification Table) 608 by defining a stream type "Notification" 600. An OUI selector is used in the PMT 606 in order to allow a first selection of the ANT table 608 to be used, since multiple ANT tables can be supported. If the receiver/decoder 13 finds the right OUI and the corresponding ANT, it will check in the ANT 608 if the descriptors match different selection criteria and then get the entry point of the data-carousel.

The PMT 606 carries a selection descriptor similar to the AIT table in order to be able to view immediately if the ANT 608 is carrying a download service or any other notification descriptor.

Filtering on OUI is performed at this level. A reserved value of OUI is defined so as to select any manufacturer STB.

The OUI data structure is shown below in Table 4j:

TABLE 4j

| Syntax | Nbr. of Bits | Format | Code |
|---|---|---|---|
| Action Notification list descriptor ( ) { | | | |
| descriptor_tag | 8 | Uimsbf | |
| descriptor_length | 8 | Uimsbf | |

TABLE 4j-continued

| Syntax | Nbr. of Bits | Format | Code |
|---|---|---|---|
| OUI | 32 | Uimsbf | 0xFFFFFFFF is for all OUI |
| for(i=0; i<N; i++){ | | | |
| Action_Identifier | 16 | uimsbf | |
| reserved_future_use | 3 | bslbf | |
| ANT version number | 5 | uimsbf | |
| } | | | |

The Action_Identifier field is equal to the action code value of the ANT i.e. the TID_Ext of the ANT.

As all tables include a version number, by filtering the PMT version number change, it can be seen if an ANT version number has changed and which one, without having to check each ANT separately.

The NIT or BAT linkage descriptor has the structure shown in Table 4k:

TABLE 4k

| linkage_descriptor( ){ | length (bit) |
|---|---|
| descriptor_tag | 8 |
| descriptor_length | 8 |
| transport_stream_id | 16 |
| original_network_id | 16 |
| service_id | 16 |
| linkage_type | DVB defined |
| for (i=0;i<N;i++){ | "download |
| private_data | signalling" |
| } | |
| } | |

This linkage descriptor points to a download service where a PMT refers to one or several ANT components.

In a first step, the goal is to reach a service carrying all the descriptions of available notifications. In a second step, analysis of the PMT of this service is performed. Each notification table is made for a specific action including specific selectors to affect only required STBs. So to allow for OUI filtering, the presence of an Action_Notification_List_descriptor under each ANT PID is mandatory. An ANT PID can carry more than one ANT_sub table corresponding to different action notifications from the same OUI provider. Each ANT is different from its TID_Extension field. If "download" is described as a possible action and the OUI code matches with the receiver, then the ANT is downloaded by the STB. Once loaded, analysis of the ANT helps to describe more precisely the matching download available in time. Scheduling is possible so that referencing and programming a download in the future without download code present in the stream at the time of programming is feasible.

When a match is found between the download description and STB characteristics within the different available described code, then the STB can jump to a download code entry_point described by an association_tag 610, or if in another service by a deferred_association_tag 612, or if code is not yet available the start time and location has to be memorized by the STB. After that, it is up to the STB provider to analyse and use the data pointed to by the memorized entry_point (ON_ID, TS_Id, SV_ID and association_tag). The format of the downloaded data can be any format the provider wishes.

Nonetheless, data shall be ordered in a way that,

- even with the first filtering, a check between STB characteristics and download code is to be made before doing the download=>a clear identity of the code has to be defined
- capability in the same data PID to carry multiple download codes—one per hardware version for example—means a way to distinguish data for each version among the whole set of present data (selection of modules in a data_carousel)

The ANT and related mechanisms provide an extension of conventional signaling methods indicating to one or several set-top-boxes the location in the transport stream or in another transport stream where a new loader version can be found, namely a new downloadable version of their software code.

The table structure described above is particularly helpful in the case of a scheduled download.

Application Example: Targeted Tables

As described above for the ANT table, targeting of tables is possible by including target descriptors in the descriptor loops. Two examples of target descriptors are given below. The first, Target_RSM_Descriptor, is used to target particular smartcards. The second, Target_Platform_Descriptor, is used to target specific hardware and/or software platforms.

Target_RSM_Descriptor

This descriptor, described in Table 5 below, enables an action to be carried out for a list of smartcard identifiers, and is placed in the common descriptor loop of the ANT table. Several consecutive descriptors may appear in the table.

TABLE 5

| Name | Size (bits) | Format | Default value |
|---|---|---|---|
| Target_RSM_descriptor ( ) { | | | |
| Descriptor_tag | 8 | uimsbf | TBD |
| Descriptor_length | 8 | uimsbf | |
| Ca_system_id | 16 | uimsbf | |
| Number_of_tester | 8 | uimsbf | N |
| For (i=0;i<N;i++) { | | | |
| RSM_serial_number | 48 | uimsbf | |
| QEV | 8 | uimsbf | |
| } | | | |
| } | | | |

Description of Fields:

Number_of_tester: This number identifies the number of RSM concerned by a download.

RSM_serial-number: Qui etes Vous (available for Mediaguard smartcard)

Qev: Qui etes Vous (available for Mediaguard smartcard)

Target_Platform_Descriptor

This descriptor, described in Table 6 below, allows an action to be carried out for a list of platform identifiers. It is placed in the common descriptor loop of the ANT table. Several consecutive descriptors may appear in the table, one per platform.

TABLE 6

| Name | Size (bits) | Format | Default value |
|---|---|---|---|
| Target_Platform_descriptor ( ) { | | | |
| Descriptor_tag | 8 | uimsbf | TBD |
| Descriptor_length | 8 | uimsbf | |
| Hardware_version_number | 32 | bslbf | |
| Number_of_versions_concerned | 8 | uimsbf | N |
| For (i=0;i<n;i++) { | | | |
| Global_soft_id | 16 | uimsbf | |
| } | | | |
| } | | | |

Description of Fields:

Hardware_version_number: This number identifies the hardware platform within one manufacturer.

Number_of_versions_concerned: This number identifies the number of software platforms concerned by a download.

Global_soft_id: This field identifies per hardware platform the software versions of STBs concerned by the code download The Target_RSM_Descriptor (Table 5) and Target_Platform_Descriptor (Table 6) are used to target tables and table sections to particular smartcards and/or platforms. As such, they may be used in applications other than the Action Notification Table described above, and the Video on Demand application described below. This targeting functionality can be particularly useful for testing new applications, by targeting the application and related information at a defined set of test devices. In the Video-on-Demand application described below, targeting may also be used to provide, for example, different languages or different prices for different customers. By using targeting descriptors to provide multiple languages, transmission bandwidth may be saved, as only the sound component of the programne needs to be duplicated; the picture component remains the same regardless of the language. Targeting descriptors essentially provide an extension to usual table filtering methods.

Targeting descriptors may be placed both in the common and in the specific descriptor loops. Use of the first common descriptor loop provides a first level filter giving the common filtering parameters applicable to all possible filters. Other common information about this table may be included in this common descriptor loop.

The identifier loop can then be interpreted as an OR condition, whilst the inner, specific descriptor loops provide an AND condition. For example, if three filters are declared, each having two linked conditions, the identifier loop will contain three items containing two descriptors each.

Application Example: Video on Demand Application

In a second application example, both the long and short table section formats are used to transmit information to the receiver/decoder related to Video-on-Demand offerings.

In the context of a Video-On-Demand (VoD) application, an asset catalogue (an asset is a particular VOD offering, for example a film) is composed of metadata. This metadata comes from the Content Provider (in XML format) and is put into MPEG private sections. Those sections sent to the STB are broadcast in a carousel mode.

There may be a large number of assets offered through the VoD system. A data format must therefore be provided that can be used for large numbers of assets, say, for example, in the tens or hundreds of thousands.

Considering the size of data for each asset, two levels of information are provided:

First level: providing the title, rating and category of an asset.

Second level: providing the summary, actor's list, language and subtitle information, and other programme-related information.

At the first level, a set of tables may be provided listing assets, for example TV programs. For easy access to the tables, these tables have the same Table IDs but different Table ID extensions. The Table ID extensions are used to categorize assets. For example, one table may list films, while another lists sports events. This enables the tables relating to a required category of assets to be extracted easily from the MPEG stream through hardware filtering. The user may, for example, request to see a list of sports programmes. By combining the Table ID for the asset tables with the category code for sports programmes in the Table ID extension field, the correct asset table may be easily retrieved.

This table will contain a list of all assets in that category, that is to say, in this example, all sports programmes. This list may then be displayed to the user. If the user requests further information on one of these programmes, a second level table is retrieved containing further information relating to this particular asset, such as the cost of the programme and a description of the content. Here an asset identifier is used as the Table Identifier Extension to enable hardware filtering on the asset identifier and thus fast retrieval of the relevant asset information.

The possible available categories are also transmitted in another MPEG private data table.

The list of available assets constitutes a program catalogue. Further tables are provided for the update of the catalogue as will be described below.

The following formats are based on the above generic format descriptions for private tables to ensure reusability of parsing modules. These formats make use of the fact that the section filtering module in the decoders is based on a hardware 8-byte mask (table_id+7 bytes from the tid_ext field, including the tid_ext).

Note that the priority of categories and assets in the following tables shall be ordered with the lower value with the higher priority so that when information is sorted on the tid_ext field the highest priority data is retrieved first.

Categories_Description_Table

The Categories_Description_Table (shown below in Table 7) is the first table to be retrieved from the incoming stream and provides a list of available categories. The table is based on the generic long table section format previously described. Category_id is a 2-byte field identifying the category for which further information is provided in the following descriptor list. The range of values of Category_id enables the use of category definitions and sub-category definitions, as described in more detail below.

The higher byte of Category_id defines a category. The lower byte of Category_id defines a sub-category. Thus for example Category_id 0x1200 defines category 0x12 and sub-category 0x00. Similarly, Category_id 0x1234 defines the same category 0x12 but a different sub-category 0x34.

For example, a category_name_descriptor following Category_id 0x1200 may represent the visual name of the category, and the category_name_descriptor following Category_id 0x1234 may represent the name of a different subcategory of the same category.

Category 0x00 is a reserved value that allows a generic sub category definition to be used. For example, if it is necessary to define a generic sub_category "live_event" with sub-category id 0x01 in all the possible categories then it is possible to define a 0x0001 value as category_id and a descriptor with "live_event" as text content.

TABLE 7

| Name | Size (bits) | Format | Value/Comment |
|---|---|---|---|
| Categories_Description _section( ) | | | |
| { | | | |
|     Table_id | 8 | Uimsbf | 0x90 |
|     Section_syntax_indicator | 1 | Bslbf | 1b |
|     Private_syntax_indicator | 1 | Bslbf | 1b |
|     ISO reserved | 2 | Bslbf | 11b |
|     Section_length | 12 | Uimsbf | Max value = 0xFFD |
|     Tid_extension | 16 | Uimsbf | Unused = 0x0000 but may change in future |
|     Reserved | 2 | Bslbf | 11b |
|     Version_number | 5 | uimsbf | |
|     Current_next_indicator | 1 | Bslbf | 1b |
|     Section_number | 8 | uimsbf | |
|     Last_section_number | 8 | uimsbf | |
|     Reserved | 16 | bslbf | 0xFFFF |
|     Data_Parsing_Format | 8 | uimsbf | See explanation |
|     Priority | 2 | Bslbf | 11b |
|     Data_Cyphered_flag | 1 | bslbf | |
|     Data_Compressed_flag | 1 | bslbf | |
|     Data_Cyphering_Algorithm | 2 | uimsbf | See explanation |
|     Data_Compressing_algorithm | 2 | uimsbf | See explanation |
|     Reserved | 4 | Bslbf | 1111b |
|     Common_category_info_length | 12 | uimsbf | N1 = 0 |
|     For (i=0; i<N1; i++) { | | | |
|         Descriptor( ) | | | |
|     } | | | |
|     For (i=0; i<N2; i++) { | | | |

TABLE 7-continued

| Name | Size (bits) | Format | Value/Comment |
|---|---|---|---|
| Category_Id_length | 8 | uimsbf | N = 2 |
| Category_id | 8*N | uimsbf | |
| Reserved | 4 | bslbf | 1111b |
| Category_descriptor_length | 12 | uimsbf | N3 |
| for (j=0, j<N3, j++) { | | | |
|     Descriptor( ) | | | |
| } | | | |
| } | | | |
| CRC_32 | 32 | Rpchof | |
| } | | | |

The descriptors to be stored in the category_descriptor_loop are shown below in Table 8.

Category_name_descriptor

TABLE 8

| Name | Size (bits) | Format | Value/Comment |
|---|---|---|---|
| Category_name_descriptor( ) { | | | |
|   descriptor_tag | 8 | Uimsbf | 0xC9 |
|   descriptor_length | 8 | Uimsbf | |
|   Category_code | 8 | Uimsbf | |
|   ISO_639_Language_Code | 24 | Uimsbf | |
|   Category_name_length | 8 | Uimsbf | |
|   for (i=0; i<N; i++) { | | | |
|     Category_name_char | 8 | Uimsbf | |
|   } | | | |
| } | | | |

ASSET Tables

The first level of asset information is based on the long format syntax for private sections (Section_syntax_indicator=1).

Each table corresponds to a specific category and sub_category identified by their respective identifiers. A table can describe more than 10000 assets since it can be made of 256 sections of 4 kbytes each.

The category and sub_category ratings (which replace the tid_ext field) lie in the hardware filter depth to ensure fast filtering of a group of assets based on rating criteria. Ratings are encoded in 8 bits to be consistent with the DVB parental_rating_descriptor that is used, for example, in typical Pay-Per-View applications.

Each table is made of an asset_id loop. A first descriptor loop carries common attributes which apply to all asset_id.

A second descriptor loop carries specific attributes which apply to a particular asset. When an attribute is defined in the first and second loop, the second definition overrides the common definition.

The structure of the asset information table section is shown in Table 9.

TABLE 9

| Name | Size (bits) | Format | Value/Comment |
|---|---|---|---|
| Asset_information_section( ) { | | | |
|   Table_id | 8 | Uimsbf | 0x91 |
|   Section_syntax_indicator | 1 | Bslbf | 1b |
|   Private_syntax_indicator | 1 | Bslbf | 1b |
|   ISO reserved | 2 | Bslbf | 11b |
|   Section_length | 12 | Uimsbf | Max value = 0xFFD |
|   Category_id | 8 | Uimsbf | |
|   Sub_category_id | 8 | Uimsbf | Tid_ext |
|   Reserved | 2 | Bslbf | 11b |
|   Version_number | 5 | uimsbf | |
|   Current_next_indicator | 1 | Bslbf | 1b |
|   Section_number | 8 | uimsbf | |
|   Last_section_number | 8 | uimsbf | |
|   Category_rating | 8 | uimsbf | |
|   Sub_category_Rating | 8 | uimsbf | |
|   Data_Parsing_Format | 8 | uimsbf | See explanation |
|   Priority | 2 | Bslbf | 11b |
|   Data_Cyphered_flag | 1 | bslbf | |
|   Data_Compressed_flag | 1 | bslbf | |
|   Data_Cyphering_Algorithm | 2 | uimsbf | See explanation |
|   Data_Compressing_algorithm | 2 | uimsbf | See explanation |
|   Reserved | 4 | Bslbf | 1111b |
|   Common_Asset_info_length | 12 | uimsbf | N1 |
|   for (i=0; i<N1; i++) { | | | |
|     Descriptor( ) | | | |
|   } | | | |
|   For (i=0; i<N2; i++) { | | | |

TABLE 9-continued

| Name | Size (bits) | Format | Value/Comment |
|---|---|---|---|
|     Asset_Id_length | 8 | uimsbf | N |
|     Asset_id | 8*N | uimsbf | |
|     Reserved | 4 | bslbf | 1111b |
|     Asset_descriptor_length | 12 | uimsbf | N3 |
|     for (j=0, j<N3, j++) { | | | |
|         Descriptor( ) | | | |
|     } | | | |
| } | | | |
|     CRC_32 | 32 | Rpchof | |
| } | | | |

Asset_id_length: number of bytes used to define the value field
Asset_id: Identifier or group of identifiers describing the following descriptor loop.

The second level of asset information is based on the short format syntax for private sections (Section_syntax_indicator=0).

Due to the hardware filter depth, it is possible to set up a filter to access a specific asset_id. The 24-bit reserved field is defined to be consistent with the generic format for short section syntax. It actually complements the hardware filter mask.

A descriptor loop is used to encode attributes which are related to an asset.

The table section structure is described in Table 10.

TABLE 10

| Name | Size (bits) | Format | Value/Comment |
|---|---|---|---|
| Asset_more_information_section( ) { | | | |
|   Table_id | 8 | Uimsbf | 0x92 |
|   Section_syntax_indicator | 1 | Bslbf | 0b |
|   Private_Syntax_indicator | 1 | Bslbf | 1b |
|   ISO reserved | 2 | Bslbf | 11b |
|   Section_length | 12 | Uimsbf | Max value = 0xFFD |
|   Asset_id | 32 | Uimsbf | |
|   Reserved | 24 | Uimsbf | 0xFFFFFF |
|   Data_Parsing_Format | 8 | uimsbf | See explanation |
|   Priority | 2 | Bslbf | 11b |
|   Data_Cyphered_flag | 1 | bslbf | |
|   Data_Compressed_flag | 1 | bslbf | |
|   Data_Cyphering_Algorithm | 2 | uimsbf | See explanation |
|   Data_Compressing_algorithm | 2 | uimsbf | See explanation |
|   Reserved | 4 | Bslbf | 1111b |
|   Common_Asset_info_length | 12 | uimsbf | N1 |
|   for (i=0; i<N1; i++) { | | | |
|     Descriptor( ) | | | |
|   } | | | |
| } | | | |

Some possible descriptors for inclusion in the descriptor loops of either the Asset_information_section or the Asset_more_information_section are now described.

Asset_name_descriptor

This descriptor is placed in the asset loop of the Asset Information Table. Its structure is described in Table 11.

TABLE 11

| Name | Size (bits) | Format | Value/Comment |
|---|---|---|---|
| Asset_name_descriptor( ) { | | | |
|   Descriptor_tag | 8 | Uimsbf | 0xC1 |
|   Descriptor_length | 8 | uimsbf | |
|   Start_date | 40 | Bslbf | |
|   End_date | 40 | Bslbf | |
|   Asset_rating | 8 | Uimsbf | |
|   ISO_639_language_Code | 24 | Uimsbf | See norm |
|   Title_length | 8 | Uimsbf | Max 0x3C |
|   For (i=0; i<N; i++) { | | | |
|     Title_char | 8 | Uimsbf | |
|   } | | | |
| } | | | |

The following descriptors are normally placed in the Asset_more_information_table. However, some of these may also be used as attributes in the Asset_Information_Table.

Source_descriptor

This descriptor, defined in Table 12 below, provides information about aspects of the presentation format of an asset.

TABLE 12

| Name | Size (bits) | Format | Value/Comment |
|---|---|---|---|
| Source_descriptor( ) { | | | |
|   Descriptor_tag | 8 | Uimsbf | 0xC2 |
|   Descriptor_length | 8 | Uimsbf | |
|   Reserved | 6 | Bslbf | 111111b |
|   Surround | 1 | Bslbf | |
|   Widescreen | 1 | Bslbf | |
|   Language | 24 | Bslbf | |
|   Subtitle_language | 24 | Bslbf | |
| } | | | |

Asset_more_info_descriptor

This descriptor, defined in Table 13 below, provides miscellaneous information about an asset.

TABLE 13

| Name | Size (bits) | Format | Value/Comment |
|---|---|---|---|
| Asset_more_info_descriptor( ) { | | | |
|   Descriptor_tag | 8 | Uimsbf | 0xC3 |
|   Descriptor_length | 8 | uimsbf | |
|   Duration | 24 | bslbf | |
|   Retail_price | 48 | bslbf | |

TABLE 13-continued

| Name | Size (bits) | Format | Value/Comment |
|---|---|---|---|
| Year | 32 | bslbf | |
| Provider_Country_Code | 24 | Uimsbf | |
| Provider_name_length | 8 | Uimsbf | Max 0x10 |
| for (i=0; i<N; i++) { | | | |
|     Provider_name_char | 8 | uimsbf | |
| } | | | |
| } | | | |

Asset_description_descriptor

This descriptor, defined in Table 14 below, provides a textual description of an asset.

TABLE 14

| Name | Size (bits) | Format | Value/Comment |
|---|---|---|---|
| Asset_description_descriptor( ) { | | | |
|   Descriptor_tag | 8 | uimsbf | 0xC5 |
|   Descriptor_length | 8 | uimsbf | |
|   ISO_639_Language_Code | 24 | uimsbf | |
|   For (j=0; j<N; j++) { | | | |
|     Description_char | 8 | uimsbf | |
|   } | | | |
| } | | | |

Actors_descriptor

This descriptor, defined in Table 15 below, provides information about an actor appearing in an asset such as a film.

TABLE 15

| Name | Size (bits) | Format | Value/Comment |
|---|---|---|---|
| Actors_descriptor( ) { | | | |
|   Descriptor_tag | 8 | Uimsbf | 0xC6 |
|   Descriptor_length | 8 | Uimsbf | |
|   ISO_639_language_Code | 24 | Uimsbf | |
|   for (j=0; j<N; j++) { | | | |
|     Actors_char | 8 | uimsbf | |
|   } | | | |
| } | | | |

Package_descriptor

This descriptor, defined in Table 16 below, provides information relating to a package of assets.

TABLE 16

| Name | Size (bits) | Format | Value/Comment |
|---|---|---|---|
| Package_descriptor( ) { | | | |
|   Descriptor_tag | 8 | Uimsbf | 0xC7 |
|   Descriptor_length | 8 | Uimsbf | |
|   ISO_639_language_Code | 24 | uimsbf | |
|   for (i=0; i<N; i++) { | | | |
|     Package_char | 8 | Uimsbf | |
|   } | | | |
| } | | | |

The following descriptors apply to all assets, so they should be located in the common descriptor loop of the Asset Information Table or if it is necessary to override a specific asset then it can be repeated in the asset_loop.

Checkout_Length_descriptor

This descriptor, defined in Table 17 below, provides information about the checkout length. It provides a mechanism for timing out connections to the VoD server.

TABLE 17

| Name | Size (bits) | Format | Value/Comment |
|---|---|---|---|
| Checkoutlength_descriptor( ) { | | | |
|   Descriptor_tag | 8 | Uimsbf | 0xC4 |
|   Descriptor_length | 8 | uimsbf | |
|   CheckoutLength | 16 | uimsbf | |
| } | | | |

Stream_control_descriptor

This descriptor, defined in Table 18 below, provide stream control information. It is defined below as a variant data structure using if-statements.

TABLE 18

| Name | Size (bits) | Format | Value/Comment |
|---|---|---|---|
| Stream_control_descriptor( ) { | | | |
|   Descriptor_tag | 8 | uimsbf | 0xC8 |
|   Descriptor_length | 8 | uimsbf | |
|   Control_flags | 8 | uismbf | See explanation |
|   If(Pause_Control == '1') { | | | |
|     PauseLimitSeconds | 16 | uimsbf | |
|     ActionOnPauseLimits | 8 | uimsbf | |
|   } | | | |
|   If (Fast_Forward_Control == '1') { | | | |
|     PauseLimitSeconds | 16 | uimsbf | |
|     ActionOnPauseLimits | 8 | uimsbf | |
|   } | | | |
|   If (Rewind_Control == '1') { | | | |
|     PauseLimitSeconds | 16 | uimsbf | |
|     ActionOnPauseLimits | 8 | uimsbf | |
|   } | | | |
| } | | | |

The Control_flags attribute is described in Table 19 below.

TABLE 19

| Bit | Description | Comment |
|---|---|---|
| 0 | Pause control | 0: disabled/1: enabled |
| 1 | Fast Forward control | 0: disabled/1: enabled |
| 2 | Rewind control | 0: disabled/1: enabled |
| 3 . . . 7 | Reserved | |

Catalogue Update

When the VoD application is launched, the Asset Information Tables are loaded to display available assets. (Category ratings are taken into account in order to hide categories with unauthorised movies).

When the subscriber needs additional information for a specific asset, it loads the corresponding Asset_more_information_table.

Furthermore, to update asset information, the following Catalog_Update_table, as described in Table 20, may be broadcast, which indicates the category and sub-category that should be updated.

TABLE 20

| Name | Size (bits) | Format | Value Comment |
|---|---|---|---|
| Catalog_update_section( ) { | | | |
|   Table_id | 8 | Uimsbf | 0x93 |
|   Section_syntax_indicator | 1 | Bslbf | 1b |
|   Private_section_indicator | 1 | Bslbf | 1b |
|   ISO reserved | 2 | Bslbf | 11b |
|   Section_length | 12 | Uimsbf | Max value = 0xFFD |
|   Reserved | 16 | Uimsbf | 0xFFFF |
|   Reserved | 2 | Bslbf | 11b |
|   Version_number | 5 | uimsbf | |
|   Current_next_indicator | 1 | Bslbf | 1b |
|   Section_number | 8 | uimsbf | |
|   Last_section_number | 8 | uimsbf | |
|   Update_counter | 8 | uimsbf | |
|   Reserved | 4 | Bslbf | 1111b |
|   Current_Action_flags | 4 | bslbf | |
|   Data_Parsing_Format | 8 | uimsbf | See explanation |
|   Priority | 2 | Bslbf | 11b |
|   Data_Cyphered_flag | 1 | bslbf | |
|   Data_Compressed_flag | 1 | bslbf | |
|   Data_Cyphering_Algorithm | 2 | uimsbf | See explanation |
|   Data_Compressing_algorithm | 2 | uimsbf | See explanation |
|   Reserved | 4 | bslbf | |
|   Counter_descriptor_loop_length | 12 | uimsbf | |
|   For (i=0; i<N; i++) { | | | |
|     Category_descriptors( ) | | | |
|   } | | | |
|   CRC32 | 32 | Rpchof | |
| } | | | | update_counter: This counter is incremented by one each time the catalogue has been fully updated. When only some modifications occur, this counter is incremented by one. The first value of Update_Counter field is 0. When the database extractor is reset, this counter may be reset to value 0 but the Current_Action_Flags field shall be set to 0001 to indicate a full update of the complete database. Since the field size is limited to 8 bits, the value is understood by the STB to be expressed modulo 256. The update counter enables the STB to determine when new information needs to be downloaded.

Category_counter_descriptor: The counter descriptor identifies a version counter for an asset information table. It enables a STB to determine when asset information has been updated so that it may download up-to-date information.

Current_action_flags: Various flags may be simultaneously raised corresponding to available category_descriptors in the inner loop. The individual flags are listed in Table 21.

TABLE 21

| Bit | Comment |
|---|---|
| 0 | Full_update_action |
| 1 | Partial_Add_update_action |
| 2 | Partial_Change_update_action |
| 3 | Partial_Remove_Update_Action |

Some descriptors are now described which may appear in the descriptor loops of the Catalog_update_section.

Category_Counter_descriptor

This descriptor, defined below in Table 22, provides a category/subcategory update counter.

TABLE 22

| Name | Size (bits) | Format | Value/Comment |
|---|---|---|---|
| Category_counter_descriptor( ) { | | | |
|   Descriptor_tag | 8 | Uimsbf | 0xCB |
|   Descriptor_length | 8 | Uimsbf | |
|   Category_id | 8 | Uimsbf | |
|   Sub_category_id | 8 | Uimsbf | |
|   Counter | 8 | uimsbf | |
| } | | | | counter: This 8-bit field counts the update of the Asset_Information_Table and related Asset_more_information_table for a particular category and sub-category.

Category_Action_descriptor

This descriptor, defined below in Table 23, provides information relating to the kind of update required for the specified category and subcategory combinations.

TABLE 23

| Name | Size (bits) | Format | Value/Comment |
|---|---|---|---|
| Category_Action_descriptor( ) { | | | |
|   Descriptor_tag | 8 | Uimsbf | 0xCC |
|   Descriptor_length | 8 | Uimsbf | |
|   Action | 8 | uimsbf | |
|   For (i=0;i<n:i++) { | | | |
|     Category_id | 8 | Uimsbf | |

TABLE 23-continued

| Name | Size (bits) | Format | Value/Comment |
|---|---|---|---|
|     Sub_category_id | 8 | Uimsbf | |
|   } | | | |
| } | | | |

Action: This 8 bits field specifies the action to be performed during catalogue update on the list of categories and sub-categories contained in the loop. Possible actions are given in Table 24.

TABLE 24

| Value | Action |
|---|---|
| 0x00 | Update All (no loop of Tidext after) |
| 0x01 | Add some categories |
| 0x02 | Change some categories |
| 0x03 | Remove some categories |

Plant_Id_mechanism

The plant_id mechanism is used to establish a VOD session connection with a selected server. First the receiver/decoder 13, retrieves an initialization file defined below in Table 25 and scans all frequencies available in the lookup_frequency_list_descriptor loop shown in Table 27 until it is possible to tune into one of the scanned frequencies. When one frequency is found then it is necessary to filter on the PID described in this same descriptor a Plant_Id definition table with tidext equal to Plant_id_selection field (always in the same descriptor) to retrieve the right Service_Group_Id. In parallel, the application connects to an http server using the routing_ip descriptor available in the common_descriptor_loop of the VOD_initialization_table to retrieve the IP address of the VOD server.

The Syntax of the VOD_initialization_section is shown in Table 25 below.

TABLE 25

| Name | Size (bits) | Format | Value/Comment |
|---|---|---|---|
| VOD_Initialization_section( ) { | | | |
|   Table_id | 8 | Uimsbf | 0x94 |
|   Section_syntax_indicator | 1 | Bslbf | 0b |
|   Private_Syntax_indicator | 1 | Bslbf | 1b |
|   ISO reserved | 2 | Bslbf | 11b |
|   Section_length | 12 | Uimsbf | Max value = 0xFFD |
|   Private_Filtering_Extension | 56 | uimsbf | |
|   Data_Parsing_Format | 8 | uimsbf | See explanation |
|   Priority | 2 | Bslbf | 11b |
|   Data_Cyphered_flag | 1 | bslbf | |
|   Data_Compressed_flag | 1 | bslbf | |
|   Data_Cyphering_Algorithm | 2 | uimsbf | See explanation |
|   Data_Compressing_algorithm | 2 | uimsbf | See explanation |
|   Reserved | 4 | Bslbf | 1111b |
|   Common_Descriptor_info_length | 12 | uimsbf | |
|   for (i=0, i<N1, i++) { | | | |
|     Descriptor( ) | | | |
|   } | | | |
|   For (i=0, i<N2, i++) { | | | |
|     Plant_Id_length | 8 | uimsbf | N |
|     Plant_Id | 8*n | uimsbf | |
|     Reserved | 4 | bslbf | 1111b |
|     Plant_id_descriptor_length | 12 | uimsbf | N3 |
|     for (i=0, i<N3, i++) { | | | |
|       Descriptor( ) | | | |
|     } | | | |
|   } | | | |
| } | | | |

Private_Filtering_Extension: In order to optimize use of hardware filters, this 56_bit field may be used to extend private filtering with MLOAD_table, MLOAD_group or MLOAD_section calls.
Plant_id_length: number of bytes used to define the Extra_identifier field
Plant_id: One identifier or a group of identifiers described by the following descriptor loop.

Descriptors used in the VOD_initialisation_section of Table 25 are described below.

Cable_delivery_system_descriptor

The Cable_delivery_descriptor, defined in Table 26 below, may be located in the common_descriptor_loop with a frequency_field set to 0000.0000 Mhz. It will help to give default modulation parameters for all following frequencies.

TABLE 26

| Syntax | Bit Size | Format | Value/Comment |
|---|---|---|---|
| Cable_delivery_system_descriptor( ){ | | | |
|   Descriptor_tag | 8 | Uimsbf | 0x44 |
|   Descriptor_length | 8 | Uimsbf | |
|   Frequency | 32 | bslbf | |
|   Reserved_future_use | 12 | bslbf | |
|   FEC_outer | 4 | bslbf | |

TABLE 26-continued

| Syntax | Bit Size | Format | Value/Comment |
|---|---|---|---|
| Modulation | 8 | Bslbf | |
| Symbol_rate | 28 | Bslbf | |
| FEC_inner | 4 | Bslbf | |
| } | | | |

Possible descriptors in the plant_id_descriptor_loop are as follows:

Lookup_Frequency_List_descriptor
This descriptor is defined in Table 27.

TABLE 27

| Name | Size (bits) | Format | Value/Comment |
|---|---|---|---|
| LookUp_Frequency_List_Descriptor ( ) { | | | |
| Descriptor_tag | 8 | uimsbf | 0xCD |
| Descriptor_length | 8 | uimsbf | |
| For (i=0;i<n;I++) { | | | |
| Frequency | 32 | bslbf | |
| Reserved | 3 | bslbf | 111b |
| Plant_Id_PID | 13 | uimsbf | |
| Plant_id_Selection | 16 | uimsbf | optional |
| } | | | |
| } | | | |

Frequency: This is a 32 bit field giving the 4-bit BCD values specifying 8 characters of the frequency value. The frequency is coded in MHz where the decimal occurs after the fourth character.

Plant_Id_PID: The PID value where the receiver/decoder 13 can find the plant_ID files.

Plant_id_Selection: This 16 bit field may be the Tid_ext value to be filtered on the PID while the TID value is static to retrieve the correct Plant_Id_Definition_Table. This field is optional for future extension only. If optional its value shall be set to 0xFFFF.

In a further example the reserved and Plant_Id_PID fields may be merged in order to give an association tag value that will help to find the real PID value while it is always difficult to exploit a system with static data PID referencing.

The three following descriptors should be set in the common descriptor loop as Http ODA server.

Connection_data_descriptor
This descriptor is defined in Table 28.

TABLE 28

| Syntax | Bit Size | Format | Value/Comment |
|---|---|---|---|
| Connection_data_descriptor ( ) { | | | |
| Descriptor_tag | 8 | Uimsbf | 0xE8 |

TABLE 28-continued

| Syntax | Bit Size | Format | Value/Comment |
|---|---|---|---|
| Descriptor_length | 8 | Uimsbf | |
| Login_name_length | 8 | Uimsbf | |
| For (i=0 ; i<N ; i++) { | | | |
| Login_name | 8*n | Uimsbf | |
| } | | | |
| Password_length | 8 | Uimsbf | |
| For (i=0 ; i<N ; i++) { | | | |
| Password | 8*n | uimsbf | |
| } | | | |
| } | | | |

Routing_Ipv4_descriptor
This descriptor is defined in Table 29.

TABLE 29

| Syntax | Bit Size | Format | Value/Comment |
|---|---|---|---|
| routing_descriptor_ipv4 ( ) { | | | |
| descriptor_tag | 8 | uimsbf | 0x06 |
| descriptor_length | 8 | uimsbf | |
| for(i=0; i<N; i++) { | | | |
| component_tag | 8 | uimsbf | |
| Address | 32 | uimsbf | |
| port_number | 16 | uimsbf | |
| address mask | 32 | uimsbf | |
| } | | | |
| } | | | |

The Component_tag field is not used in this example. Its value is set to 0.

Routing_ipv6_descriptor
This descriptor is defined in Table 30.

TABLE 30

| Syntax | Bit Size | Format | Value/Comment |
|---|---|---|---|
| Routing_descriptor_ipv6 ( ) { | | | |
| Descriptor_tag | 8 | uimsbf | 0x07 |
| Descriptor length | 8 | uimsbf | |
| For(i=0; i<N; i++) { | | | |
| Component_tag | 8 | uimsbf | |
| Address | 128 | uimsbf | |
| port_number | 16 | uimsbf | |
| address_mask | 128 | uimsbf | |
| } | | | |
| } | | | |

The Component_tag field is not used in this example. Its value is set to 0.

Table 31 defines the syntax of the Plant_ID_Definition_Section.

TABLE 31

| Name | Size (bits) | Format | Value/Comment |
|---|---|---|---|
| Plant_Id_Definition_section( ) { | | | |
| Table_id | 8 | Uimsbf | 0x95 |
| Section_syntax_indicator | 1 | Bslbf | 1b |
| Private_syntax_indicator | 1 | Bslbf | 1b |
| ISO reserved | 2 | Bslbf | 11b |
| Section_length | 12 | Uimsbf | Max value = 0xFFD |
| Plant_Id_Selection | 16 | Uimsbf | Tid_ext |

TABLE 31-continued

| Name | Size (bits) | Format | Value/Comment |
|---|---|---|---|
| Reserved | 2 | Bslbf | 11b |
| Version_number | 5 | uimsbf | |
| Current_next_indicator | 1 | Bslbf | 1b |
| Section_number | 8 | uimsbf | |
| Last_section_number | 8 | uimsbf | |
| Filter_extension | 16 | uimsbf | |
| Data_Parsing_Format | 8 | uimsbf | See explanation |
| Priority | 2 | Bslbf | 11b |
| Data_Cyphered_flag | 1 | bslbf | |
| Data_Compressed_flag | 1 | bslbf | |
| Data_Cyphering_Algorithm | 2 | uimsbf | See explanation |
| Data_Compressing_algorithm | 2 | uimsbf | See explanation |
| Reserved | 4 | Bslbf | 1111b |
| Common_Descriptor_info_length | 12 | uimsbf | N1 |
| for (i=0; i<N1; i++) { | | | |
| Descriptor( ) | | | |
| } | | | |
| CRC_32 | 32 | Rpchof | |
| } | | | |

VOD_Service_Group_Descriptor

This descriptor, described in Table 32 below, is used within the Plant_Id_definition_section.

TABLE 32

| Name | Size (bits) | Format | Value/Comment |
|---|---|---|---|
| VOD_Service_Group_Descriptor ( ) { | | | |
| Descriptor_tag | 8 | uimsbf | 0xCE |
| Descriptor_length | 8 | uimsbf | |
| Service_group_Identifier | 32 | uimsbf | |
| } | | | |

Use of VOD Signalization

The section below discusses how to use standard and private C+ signalization to retrieve the dedicated VOD tables from the stream.

It is first necessary to declare a VOD Portal Service. This is done with help of a service type equal to private value 0xD0 indicating that this service is a VOD one. This service type is to be reported in the service_list_descriptor of the CNIT and in the service_descriptor of the SNT (Service Network Table).

This service should find the necessary declaration to activate the VOD application; VOD service type declaration may be enough to achieve this.

Then, in the component loop of the PMT belonging to this service, there will be found a loop of private data elementary streams with stream_type 0xC1 and an attached PID. Each stream of this stream_type shall contain an appli_list_descriptor to define which of these data are broadcast using this PID.

The syntax of the appli_list_descriptor is given in Table 33 below.

TABLE 33

| Syntax | Bit Size | Format | Value/Comment |
|---|---|---|---|
| Appli_list_descriptor( ) { | | | |
| Descriptor_tag | 8 | uimsbf | 0xC2 |
| Descriptor_length | 8 | uimsbf | |
| for (i=0; i<N; i++){ | | | |
| appli_name | 64 | uimsbf | 8 char |
| } | | | |
| } | | | |

Appli_name may take the following values (restricted to 8 chars)

VOD_INIT as for the VOD_Initialization_Table
ASSET as for Asset_Information_Table (name shall be filled with space up to 8 chars)
DETAILS as for Asset_More_Information_Table.
CATEGORY as for Categories_Definition_Table
UPDATE as for the Catalog_Update_Table (name shall be filled with space up to 8 chars).

Note that for broadcast, ASSET and CATEGORY may be put into the same PID so that two appli_list_descriptors shall be present under this PID so that split in the future will be easier.

DETAILS, due to the amount of data and cycling period, should be in a different PID to ASSET and CATEGORY.

The VOD application, when starting, first displays the categories and, if the user requires, shows details present in ASSET tables. Once the PID of the data is defined, it is allowed to use direct allocated TID value to do filtering instead of complete DMT mechanism to speed up the access to information. (DMT shall be broadcast anyway giving the resolution between TID and table_name—same as in appli_list_descriptor).

During parsing of the catalogue, the UPDATE table shall be monitored in case a change occurs in categories or assets.

Then, once the user has made his choice, the VOD application uses the VOD_INIT data to scan its hub frequency. See Plant_Id_mechanism above for more details.

Once a correct frequency is retrieved, and tuning is possible, at least one Plant_Id_Definition Table is to be broadcast on a PID defined in the first PMT of the transport stream. By first PMT is meant that this is the first service declared within the PAT that should contain one elementary stream of stream_type 0xC1 with appli_list_descriptor containing PLANT_ID name in it. This PID is the PID value also described in the lookup_frequency_list_descriptor of the VOD_initialization_table for this frequency. This mechanism is established in order to be DVB compliant and so as not have a ghost PID.

Then, on this PID, a plant_Id_definition_Table is broadcast with TIDExt value equal to the Plant_Id_Selection value already defined in the lookup_frequency_list_descriptor of the VOD_initialization_table for the current tuned frequency. If this filtering does not match then a try for another frequency is made. Furthermore, a time-out to retrieve the Plant_Id_Definition_Table for a given frequency shall imply a jump to the next described frequency within the current lookup_frequency_list_descriptor of the VOD_initialization_table.

If a complete loop is made without any match then an explicit error is displayed or a new try is made for the complete frequency list available.

Explicit error means one of the following possibilities:
No frequency found
No Plant_id table found for a tuned frequency
No PAT signalization on the frequency found
No PMT signalization on the frequency found Otherwise, with the help of IP_descriptors in the VOD_initialization_Table, the address of a server is found in order to establish a VOD session connection.

The foregoing description has defined a private table structure based on the following approach:
a model for a short section;
a model for a long section; and
examples of application-context dependent descriptors.

This system described above provides the following strategic advantages:
it allows more efficient development;
it allows the creation of an application implementation independent of the manufacturer of the receiver/decoder 13 and the manufacturer of the conditional access system.
An increase in the amount of data that may be used without increasing the cost—this is done via data compression; and
Easier development of product updates The system also provides the following advantages for the application broadcast:
the provision of a generic table parser;
chances to the parser do not have a large impact on existing applications;
normalisation of the definition of a private table;
the developer can focus on the data filtering and specific descriptors required;
Easier processing of table contents;
the extraction of data is performed by the parser;
maintains an backwards-compatibility with data formats;
integration with existing formats—private sections can use existing DVB descriptors whilst DVB tables can use private descriptors;
guarantee of non-regression;
association of an Object method with a descriptor;
facilitation of unitary tests and integration;
facilitation of operational integration (on site, without negatively affecting live broadcast); and
a reduction in the time needed to develop an application.

It will be understood that the present invention has been described above purely by way of example, and modifications of detail can be made within the scope of the invention.

Each feature disclosed in the description, and (where appropriate) the claims and drawings may be provided independently or in any appropriate combination.

The invention claimed is:

1. A table data structure, comprising:
a data portion comprising:
descriptors corresponding to a first descriptor loop, and
a variable-length loop of data items, wherein each data item includes a data item identifier and a descriptor loop comprising descriptors specific to a corresponding data item wherein the descriptors in the descriptor loops for each data item override identical common descriptors in the first descriptor loop; and
a header, wherein the header comprises an action identifier field, and wherein the action identifier field comprises data that identifies an action to be carried out by a receiver/decoder receiving the table data structure.

2. The table data structure of claim 1, wherein said action to be carried out by the receiver/decoder comprises at least one of a group consisting of: downloading a software, automatic channel scanning, rebooting the receiver/decoder, refreshing program catalogs, and displaying a message to the user of the receiver/decoder.

3. The table data structure of claim 1, wherein said header further comprises: a priority field, wherein said priority field enables prioritization of the information in the MPEG table data structure.

4. The table data structure of claim 3, wherein prioritization comprises determining an order in which the MPEG table data structure is processed when a plurality of other table data structures of a same kind are received at the same time by the receiver/decoder.

5. The table data structure of claim 1, wherein said data portion comprises a size specifier specifying a measure of a size of the data portion, wherein said data portion comprises at least one data block, wherein the at least one data block comprises a further size specifier specifying a measure of a size of the at least one data block.

6. The table data structure of claim 5, wherein the at least one data block comprises a tag which is representative of contents of the at least one data block.

7. The table data structure of claim 1, wherein the data portion further comprises:
a second header; and
a second data portion,
wherein the second header comprises data specifying a size of the first descriptor loop.

8. The table data structure of claim 1, wherein the length of the descriptor loops included within each data item is specified in the corresponding data item.

9. The table data structure of claim 1, wherein the table is an MPEG table.

10. A data structure for a private table section, comprising:
a standard header;
a data portion comprising:
descriptors corresponding to a first descriptor loop, and
a variable-length loop of data items, wherein each data item includes a data item identifier and a descriptor loop comprising descriptors specific to a corresponding data item, wherein the descriptors in the descriptor loops for each data item override identical common descriptors in the first descriptor loop; and
a further header,
wherein the further header comprises at least one of a group consisting of:
an action identifier field, wherein said action identifier field comprises data whose value identifies an action to be carried out by a receiver/decoder receiving said data structure;

a first priority field, wherein said first priority field enables prioritization of information contained in the said data structure; and a second priority field, wherein said second priority field determines the order in which said data structure is to be processed when a plurality of other data structures of a same kind are received at the same time by the receiver/decoder.

11. The data structure of claim 10, wherein said data structure is an action notification table for instructing a set top box or group of set top boxes to carry out a particular action.

12. The data structure of claim 10, wherein said data structure comprises a code download descriptor loop.

13. The data structure of claim 10, wherein the further header further comprises a filter specifier.

14. The data structure of claim 10, wherein the further header further comprises a parser type.

15. The data structure of claim 10, wherein the further header further comprises a flag which is representative of a type of transformation of the MPEG table data structure.

16. The data structure of claim 15, wherein the transformation is a compression, a decompression, an encryption, or a decryption.

17. The data structure of claim 10, wherein the private table section is an MPEG private table section.

18. A method of processing data, comprising:
converting data between a given format and a format of a data structure for an MPEG private table section, wherein the data structure comprises a data portion and a header,
wherein the header comprises an action identifier field, and wherein the action identifier field comprises data that identifies an action to be carried by a receiver/decoder receiving the data structure.

19. The method of claim 18, further comprising:
performing a transformation on said data structure, wherein performing the transformation comprises compressing, decompressing, encrypting, and decrypting, thereby forming a transformed data portion.

20. The method of claim 18, further comprising:
assembling a plurality of data blocks of the data portion to form an intermediate block; and
performing a transformation on said intermediate block, wherein performing the transformation comprises compressing, decompressing, encrypting, and decrypting, thereby forming a transformed intermediate block.

21. The method of claim 18, further comprising: performing a transformation on a block of said data structure, wherein the transformation comprises splitting the block into a plurality of sub-blocks.

22. The method of claim 21, further comprising: inspecting a size specifier of a block in the data portion to determine the splitting of the block into a plurality of sub-blocks.

23. The method of claim 19, further comprising: performing a further transformation of said transformed data portion.

24. The method of claim 19, further comprising: performing an inverse transformation of said transformed data portion.

25. The method of claim 19, further comprising: transmitting said data structure having said transformed data portion to a recipient.

26. The method of claim 19, further comprising: receiving said data structure having said transformed data portion.

27. The method of claim 18, further comprising: parsing data of said data structure for processing.

28. A receiver/decoder for receiving a table data structure, comprising:
means for receiving said MPEG table data structure, wherein the table data structure comprises a data portion and a header,
wherein the data portion comprises descriptors corresponding to a first descriptor loop and a variable-length loop of data items, wherein each data item includes a data item identifier and a descriptor loop comprising descriptors specific to a corresponding data item, wherein the descriptors in the descriptor loops for each data item override identical common descriptors in the first descriptor loop,
wherein the header comprises an action identifier field and a priority field, wherein the action identifier field comprises data that identifies an action to be carried by the receiver/decoder receiving said table data structure, and wherein said priority field enables prioritization of the information in the table data structure; and
means for processing said table data structure responsive to data comprised in the priority field.

29. The table data structure of claim 28, wherein the table is an MPEG table.

30. A broadcast system, comprising:
a transmitter arranged to transmit data a data structure for MPEG private table section, wherein said data structure comprises a data portion and a header, wherein the header comprises an action identifier field and a priority field, wherein the action identifier field comprises data that identifies an action to be carried by the receiver/decoder receiving said data structure, and wherein said priority field enables prioritization of the information in the data structure; and
a receiver/decoder for receiving said data structure.

31. An apparatus for processing data of a data structure for MPEG private table section, comprising:
means for converting data between a given format and a format of said data structure, wherein said data structure comprises a data portion and a header, wherein the header comprises an action identifier field, and wherein the action identifier field comprises data that identifies an action to be carried by a receiver/decoder receiving the data structure; and means for performing a transformation on said data structure, wherein the means for performing the transformation comprises means for compressing, means for decompressing, means for encrypting, and
means for decrypting, thereby forming a transformed data portion of said data structure.

32. The apparatus of claim 31, further comprising:
means for assembling a plurality of data blocks of the data portion to form an intermediate block.

33. The apparatus of claim 31, further comprising: means for parsing data of said data structure for processing.

* * * * *

UNITED STATES PATENT AND TRADEMARK OFFICE
CERTIFICATE OF CORRECTION

PATENT NO. : 7,342,966 B2
APPLICATION NO. : 10/344923
DATED : March 11, 2008
INVENTOR(S) : Thierry Lepine et al.

It is certified that error appears in the above-identified patent and that said Letters Patent is hereby corrected as shown below:

Title Page, Item (30) Foreign Application Priority Data, line 1, application number "01401512" should be --01401512.7--.

Title Page, Item (56) Reference Cited, "Other Documents" the following reference is erroneously missing: "ETSI TS 102 006 V1.2.1; "Digital Video Broadcasting (DVB); specification for System Software Update in DBV System", European Broadcasting Union Technical Specification, October 2002, pp 1-39".

Title Page, Item (56) Reference Cited, "Other Documents" the following reference is erroneously missing: "ISO/IEC 13818-1; "Information Technology – Generic Coding of Moving Pictures and Associated Audio Information: Systems"; First Edition April 15, 1996; pp. 1-119.".

Signed and Sealed this

Twenty-third Day of June, 2009

JOHN DOLL
*Acting Director of the United States Patent and Trademark Office*